(12) United States Patent
Motoi

(10) Patent No.: US 10,565,299 B2
(45) Date of Patent: Feb. 18, 2020

(54) ELECTRONIC APPARATUS AND DISPLAY CONTROL METHOD

(71) Applicant: Toshiba Client Solutions CO., LTD., Koto-ku, Tokyo (JP)

(72) Inventor: Shigeru Motoi, Kokubunji Tokyo (JP)

(73) Assignee: Toshiba Client Solutions CO., LTD., Tokyo (JP)

( * ) Notice: Subject to any disclaimer, the term of this patent is extended or adjusted under 35 U.S.C. 154(b) by 444 days.

(21) Appl. No.: 15/371,691

(22) Filed: Dec. 7, 2016

(65) Prior Publication Data

US 2017/0169002 A1 Jun. 15, 2017

(30) Foreign Application Priority Data

Dec. 11, 2015 (JP) .................................. 2015-242260

(51) Int. Cl.
*G06F 3/048* (2013.01)
*G06F 17/24* (2006.01)
*G06F 3/0488* (2013.01)

(52) U.S. Cl.
CPC .......... *G06F 17/24* (2013.01); *G06F 3/04883* (2013.01)

(58) Field of Classification Search
CPC .... G06F 3/0488; G06F 17/24; G06F 3/04883; G06F 3/0486
See application file for complete search history.

(56) References Cited

U.S. PATENT DOCUMENTS

| 2008/0052140 | A1* | 2/2008 | Neal ...................... G06Q 30/02 705/1.1 |
| 2011/0078573 | A1 | 3/2011 | Ooba |
| 2011/0181492 | A1 | 7/2011 | Soeda |
| 2014/0019881 | A1 | 1/2014 | Narita et al. |
| 2014/0282147 | A1* | 9/2014 | Kim ..................... G06F 3/04847 715/765 |
| 2015/0007055 | A1* | 1/2015 | Lemus .................. G06F 3/0484 715/753 |
| 2015/0012818 | A1* | 1/2015 | Reichmann ......... G06F 17/2247 715/236 |
| 2015/0207833 | A1 | 7/2015 | Tsubotani et al. |

FOREIGN PATENT DOCUMENTS

JP 2001-345975 A 12/2001
JP 2011-070511 A 4/2011
(Continued)

*Primary Examiner* — Phuong H Nguyen
(74) *Attorney, Agent, or Firm* — Knobbe, Martens, Olson & Bear, LLP

(57) ABSTRACT

According to one embodiment, an electronic apparatus includes a display and a hardware processor. The hardware processor displays a view on a screen of the display, wherein the view includes a part of a document shared between the electronic apparatus and at least one other electronic apparatus and handwritten strokes being input from the electronic apparatus and the at least one other electronic apparatus are rendered in the view. The hardware processor determines, when an operation for pasting an object in the view is performed, whether a blank area allowing the object to be pasted exists in the view, based on an area free of the handwritten strokes in the view. The hardware processor renders the object in the blank area if the hardware processor determines that the blank area exists.

12 Claims, 18 Drawing Sheets

(56) References Cited

FOREIGN PATENT DOCUMENTS

| JP | 2011-154478 A | 8/2011 |
|----|---------------|--------|
| JP | 2011-248672 A | 12/2011 |
| JP | 2012-203643 A | 10/2012 |
| JP | 2014-021511 A | 2/2014 |
| JP | 2015-138315 A | 7/2015 |

* cited by examiner

| Stroke | Writer |
|---|---|
| ○ | User A |
| ↯ | User B |
| abcd | User C |

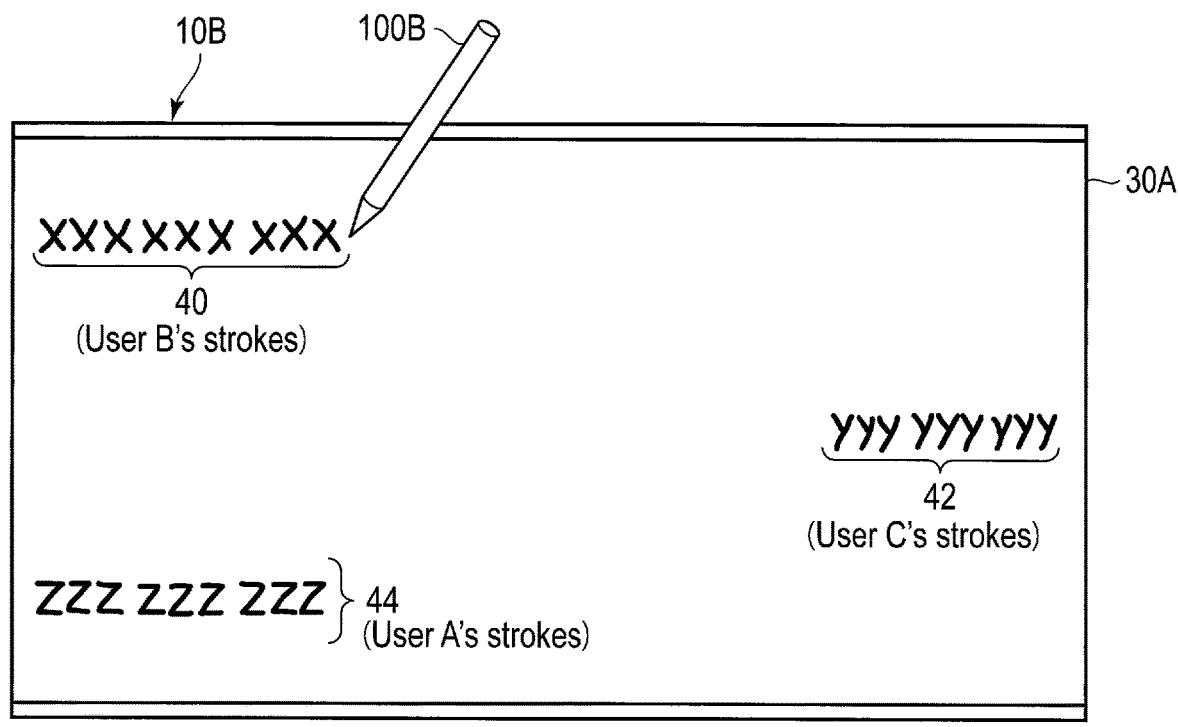
F I G. 5
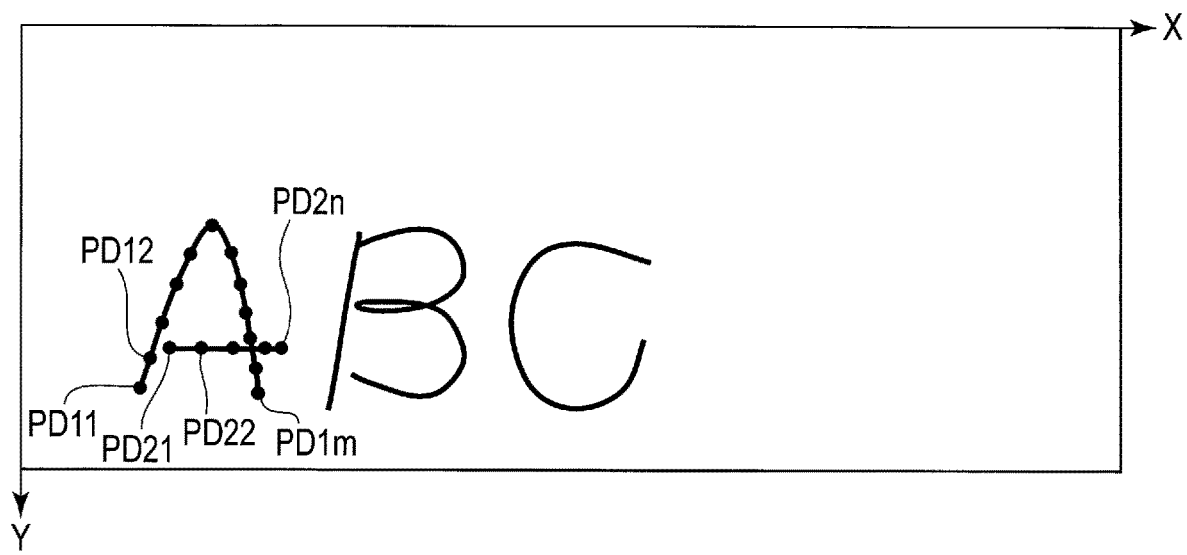
F I G. 6

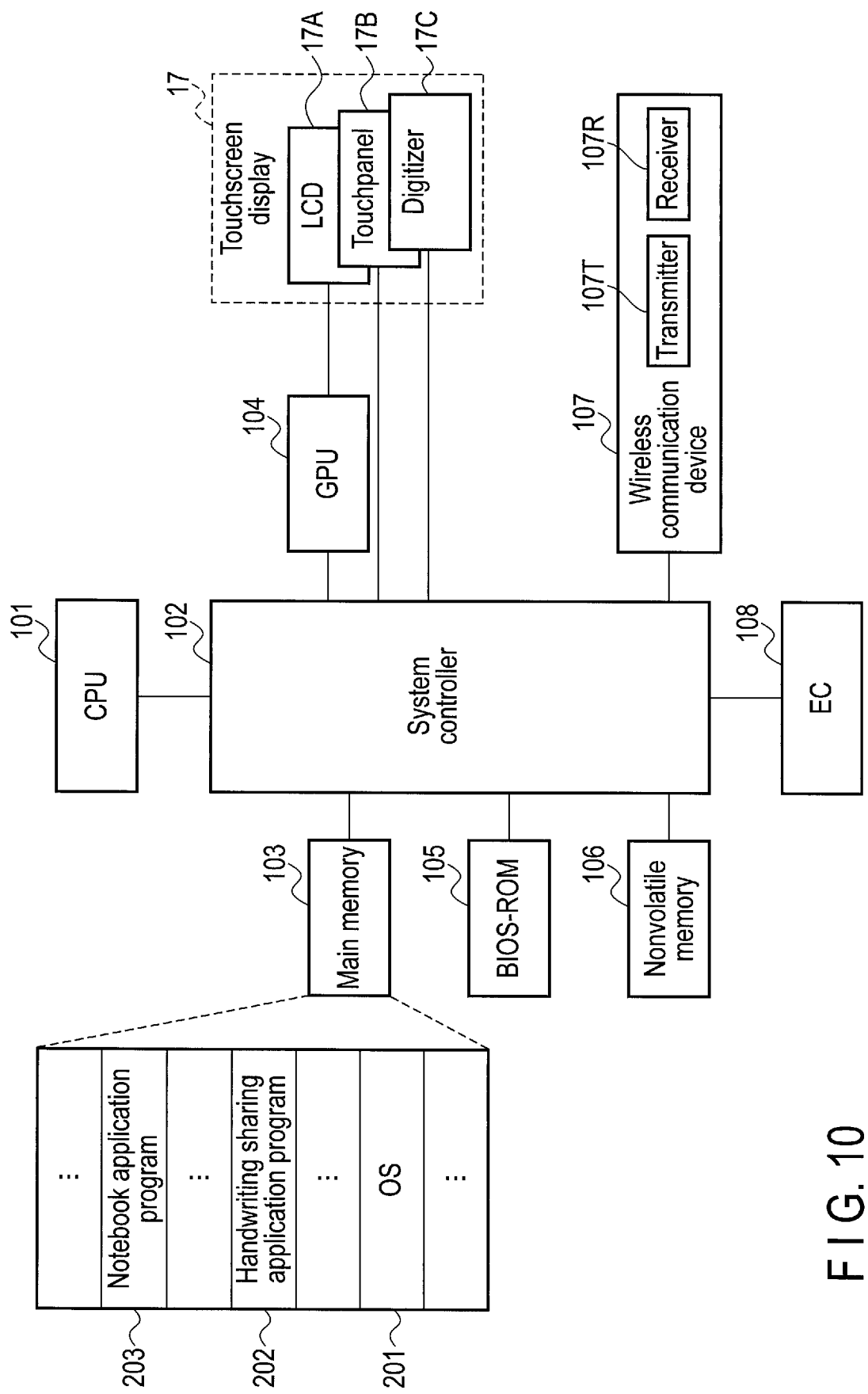
F I G. 10

| Object ID | User ID | Object data (stroke, character, graphic, image, etc.) | Coordinates | Size | Time | ... |
|---|---|---|---|---|---|---|
| ... | ... | ... | ... | ... | ... | ... |
| ... | ... | ... | ... | ... | ... | ... |
| ⋮ | ⋮ | ⋮ | ⋮ | ⋮ | ⋮ | ⋮ |
F I G. 12
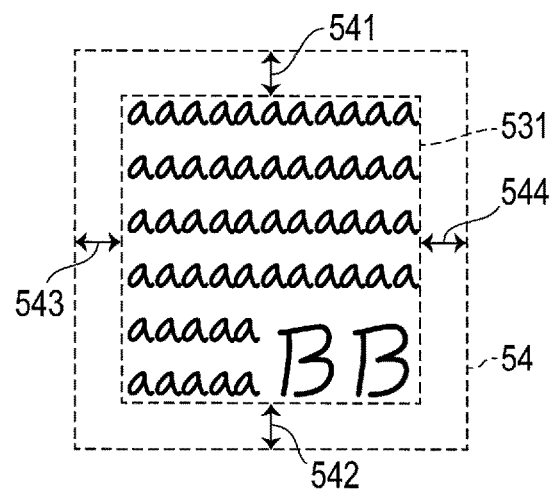
F I G. 13

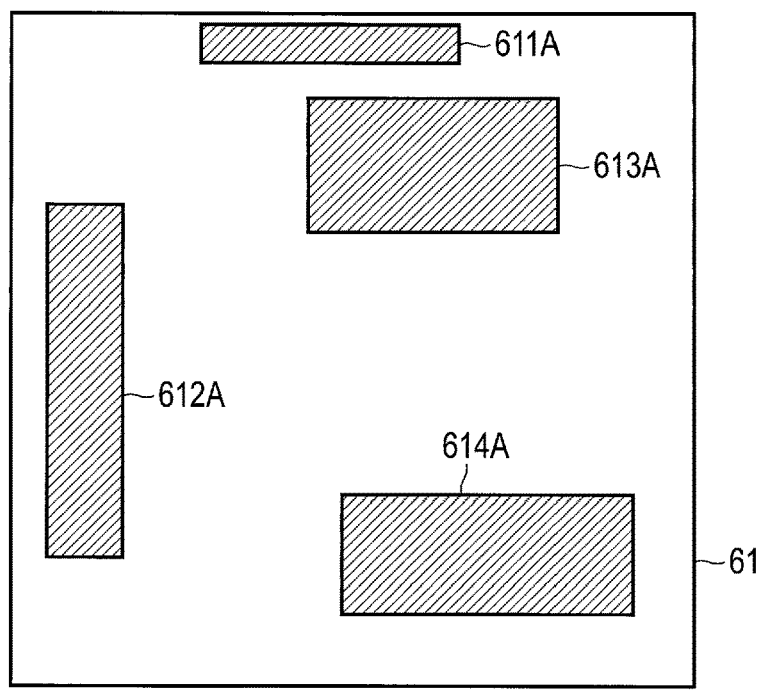
F I G. 14
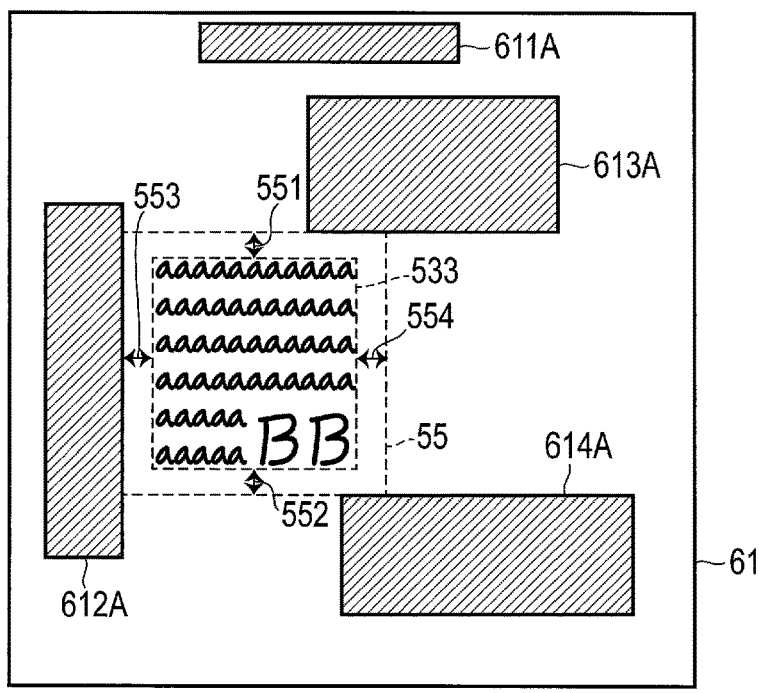
F I G. 15

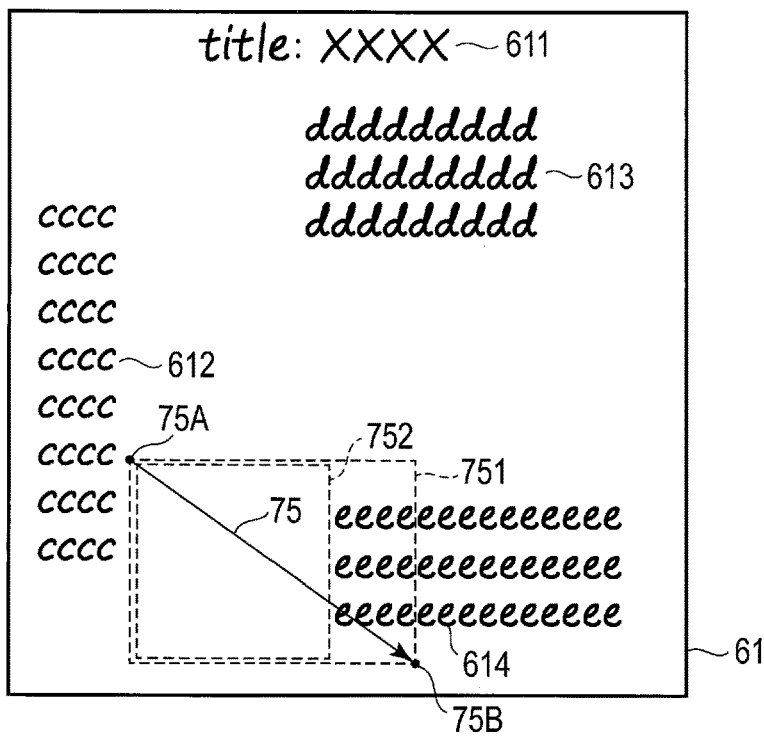
F I G. 18
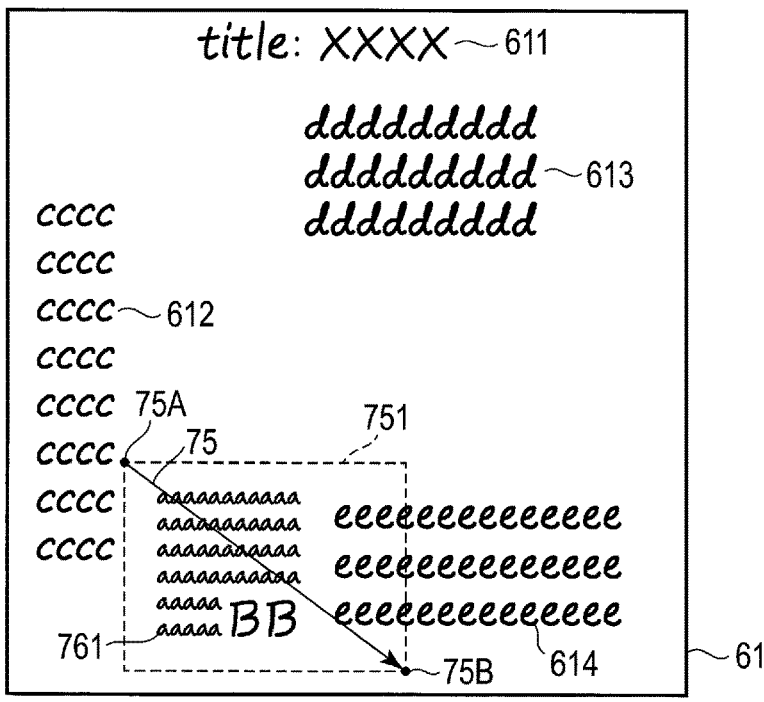
F I G. 19

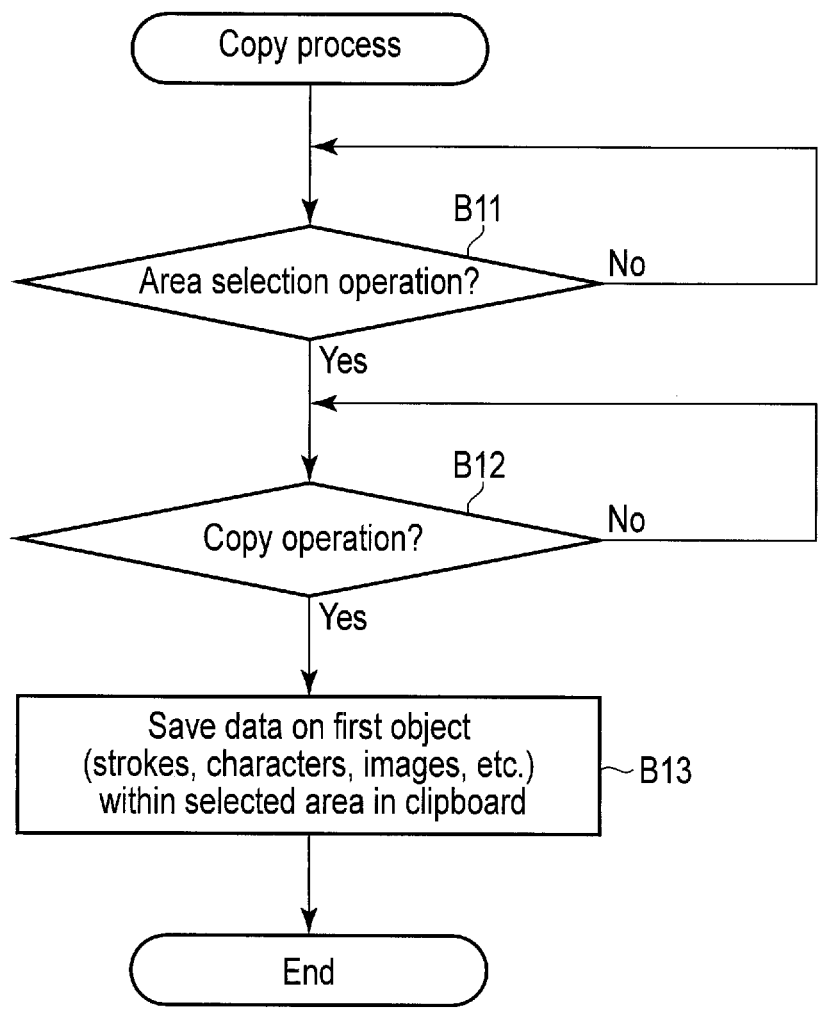
F I G. 22

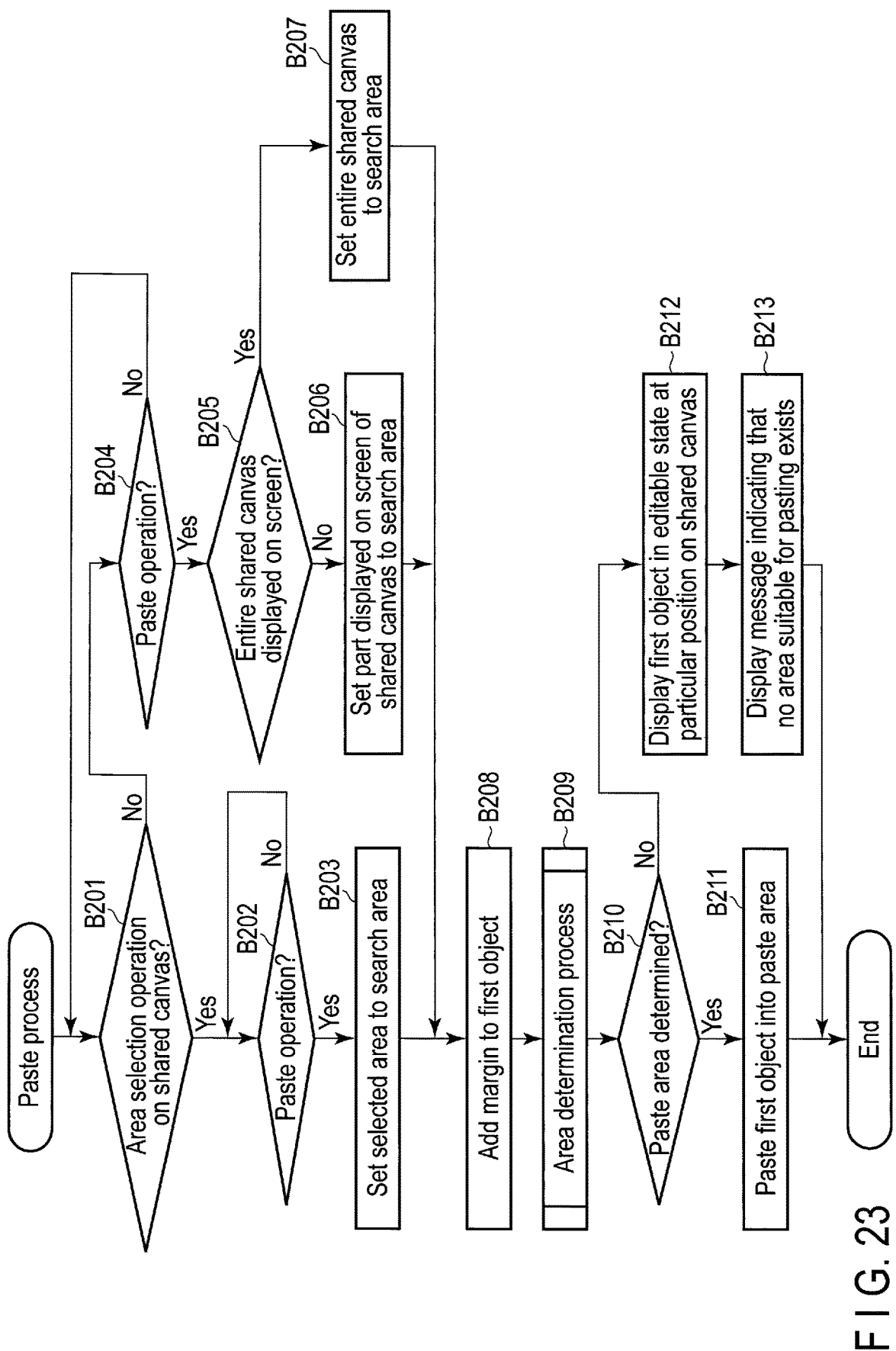
F I G. 23

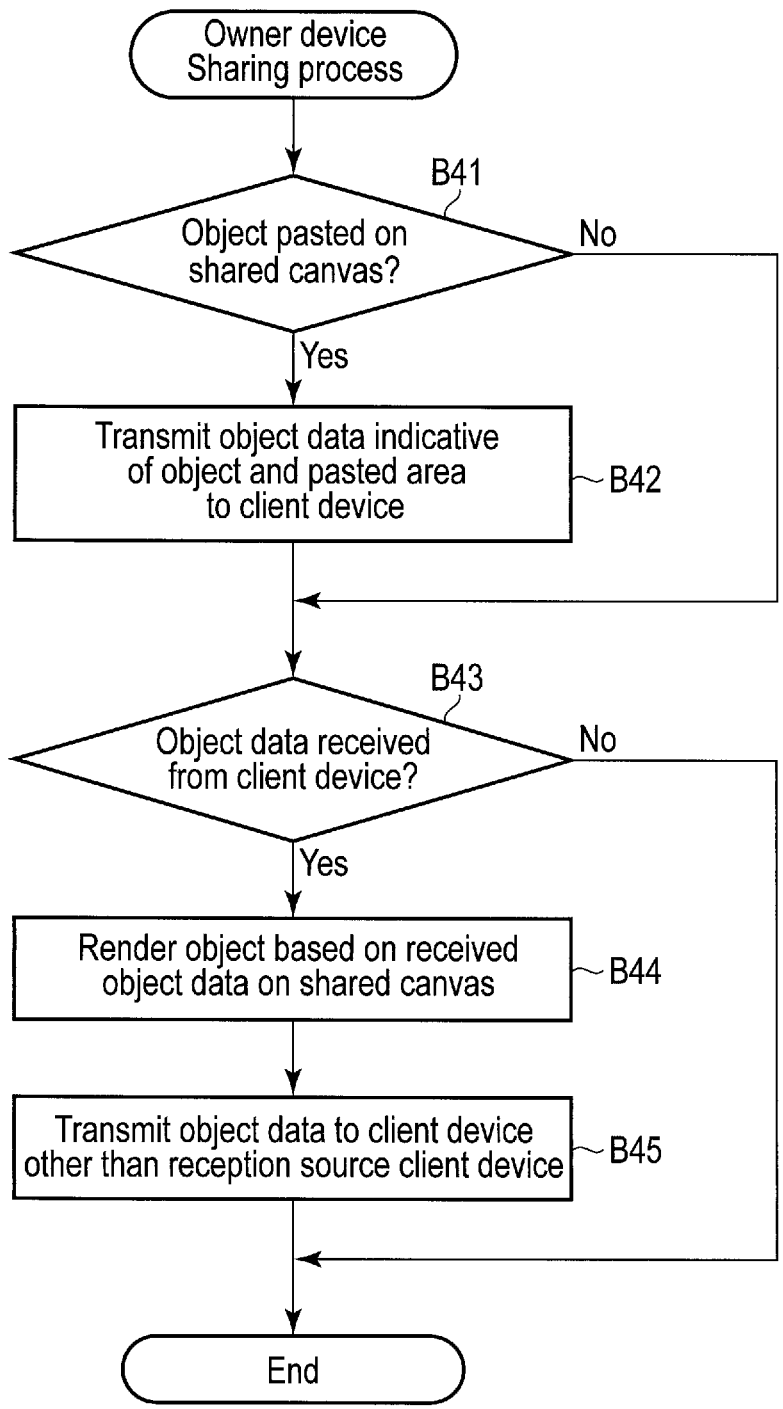
F I G. 25

ELECTRONIC APPARATUS AND DISPLAY CONTROL METHOD

CROSS-REFERENCE TO RELATED APPLICATIONS

This application is based upon and claims the benefit of priority from Japanese Patent Application No. 2015-242260, filed Dec. 11, 2015, the entire contents of which are incorporated herein by reference.

FIELD

Embodiments described herein relate generally to technology of sharing handwritten information.

BACKGROUND

Recently, various electronic apparatuses such as personal computers (PCs), tablet computers, and smartphones have been developed.

Most of the electronic apparatuses of this type include a touchscreen display to facilitate user input operations.

Further, recently, technology for sharing handwritten information has also been developed. The technology of sharing the handwritten information is useful in collaborative learning or business scenarios such as in meetings.

Meanwhile, on a screen including a canvas on which the handwritten information is shared, a copy-and-paste operation of copying the displayed object (for example, characters, images, handwritten strokes, etc.) and pasting the copied object onto the canvas (or a cut-and-paste operation) may be performed.

However, by merely performing the paste operation after the copy operation, the position where the copied object should be pasted cannot be specified. Accordingly, there is a case of the pasted object overlapping the other objects on the canvas and the visibility of the objects already displayed on the canvas being reduced.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is an illustration showing an example of a screen (canvas) on which the handwritten information is shared among the electronic apparatuses.

FIG. 6 is an illustration showing an example of a handwritten document written on touchscreen displays of the electronic apparatus of the embodiment and electronic apparatuses which use the handwriting sharing service.

FIG. 10 is an exemplary block diagram showing a system configuration of the electronic apparatus of the embodiment.

FIG. 12 is an illustration showing an example of a configuration of shared data used by the electronic apparatus of the embodiment.

FIG. 13 is an illustration showing an example in which a margin is added to the copied (or cut) object by the electronic apparatus of the embodiment.

FIG. 14 is an illustration for explaining an example in which areas of objects on a shared screen (canvas) are detected by the electronic apparatus of the embodiment.

FIG. 15 is an illustration showing an example in which an object is pasted onto the shared screen (canvas) by the electronic apparatus of the embodiment.

FIG. 18 is an illustration showing an example in which an area into which the object is pasted is preview-displayed in accordance with the user's operation by the electronic apparatus of the embodiment.

FIG. 19 is an illustration showing another example in which an area into which the object is pasted is preview-displayed in accordance with the user's operation by the electronic apparatus of the embodiment.

FIG. 22 is a flowchart showing an example of the procedure of a copy process executed by the electronic apparatus of the embodiment.

FIG. 23 is a flowchart showing an example of the procedure of a paste process executed by the electronic apparatus of the embodiment.

FIG. 25 is a flowchart showing an example of the procedure of a sharing process executed by the electronic apparatus of the embodiment when this electronic apparatus is an owner apparatus of the handwriting sharing service.

DETAILED DESCRIPTION

Various embodiments will be described hereinafter with reference to the accompanying drawings.

In general, according to one embodiment, an electronic apparatus includes a display and a hardware processor. The hardware processor is configured to display a first view on a screen of the display, wherein the first view includes a part of a document shared between the electronic apparatus and at least one other electronic apparatus and first handwritten strokes being input from the electronic apparatus and the at least one other electronic apparatus are rendered in the first view. The hardware processor is configured to determine, when an operation for pasting a first object which is rendered on the screen in the first view is performed after performing an operation for copying or cutting the first object, whether a first blank area allowing the first object to be pasted exists in the first view, based on an area free of the first handwritten strokes in the first view displayed on the screen. The hardware processor is configured to render the first object in the first blank area if the hardware processor determines that the first blank area exists.

Figure 1:
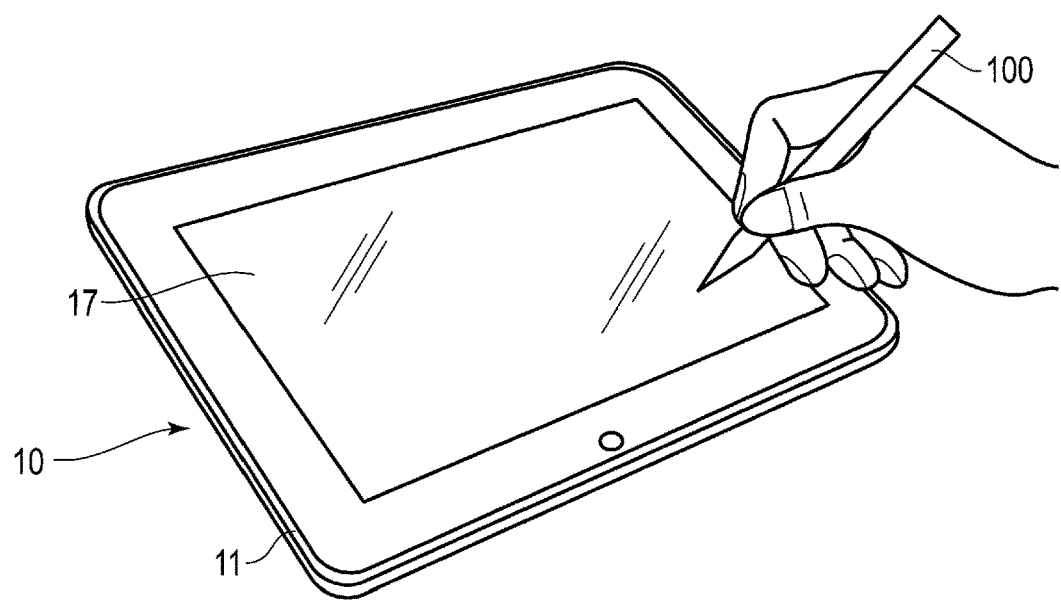
FIG. 1 is an exemplary perspective view showing an appearance of an electronic apparatus according to an embodiment.

FIG. 1 is a perspective view showing an appearance of an electronic apparatus according to an embodiment. The electronic apparatus is, for example, a pen-based portable electronic apparatus in which handwriting input using a pen (stylus) or a finger can be executed. The electronic apparatus can be realized as a tablet computer, a notebook-type personal computer, a smartphone, a PDA, etc. It is hereinafter assumed that the electronic apparatus is realized as a tablet computer 10. The tablet computer 10 is a portable electronic apparatus which is also referred to as a tablet or a slate computer.

The tablet computer 10 includes a main body 11 and a touchscreen display 17, as shown in FIG. 1. The touchscreen display 17 is arranged to be laid over a top surface of the main body 11.

The main body 11 includes a thin box-shaped housing. In the touchscreen display 17, a flat panel display and a sensor are incorporated. The sensor detects a position on a screen of the flat panel display where a stylus 100 or the finger contacts the screen (i.e., a contact position). The flat-panel display may be, for example, a liquid crystal display (LCD). As the sensor, a capacitive touchpanel or an electromagnetic induction digitizer, for example, can be used. Both two types of sensors, a digitizer and a touchpanel, may be incorporated in the touchscreen display 17.

The touchscreen display 17 can detect a position on the screen where the finger is brought into contact, and a position on the screen where the stylus 100 is brought into contact. The stylus 100 may be, for example, an electromagnetic induction stylus (a digitizer stylus). A user can write a character, etc., on the screen of the touchscreen display 17 by using an external object (a finger or the stylus 100). During the handwriting input operation, a path of movement of the external object on the screen, that is, a stroke input by hand, is drawn in real time on the screen. A path of movement of the external object while the external object is in contact with the screen corresponds to one stroke. A set of many strokes corresponding to characters or figures, etc., which are input by handwriting constitutes a handwritten document.

One stroke is represented by a set of items of point data corresponding to points on the stroke, respectively. Each item of point data represents the coordinates (an X-coordinate and a Y-coordinate) of the corresponding point. As described above, although the external object may be either the stylus 100 or the finger, a case where handwriting input is performed with the stylus 100 will be mainly described hereinafter.

Further, the tablet computer 10 executes handwriting sharing service which allows handwritten information to be shared among electronic apparatuses. The handwriting sharing service allows users of the respective electronic apparatuses to view shared handwritten information and to edit the handwritten information by collaborative work with the users of the other electronic apparatuses.

The handwriting sharing service is utilized by a group of people. The group of people who uses the handwriting sharing service may include an owner (a host) and at least one participant. The owner is also a participant who participates in the group.

Figure 2:
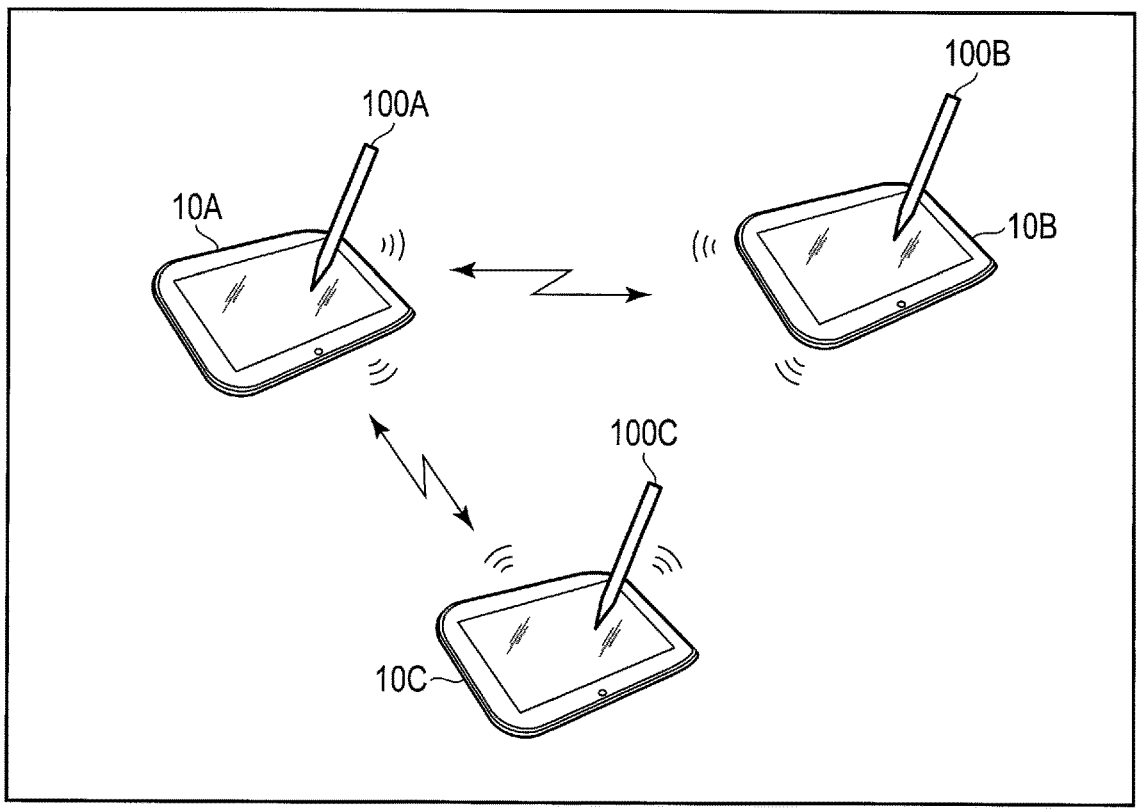
FIG. 2 is an illustration showing an example of connection between the electronic apparatus of the embodiment and the other electronic apparatuses which use handwriting sharing service.

FIG. 2 shows an example of connection between the electronic apparatuses which utilize the handwriting sharing service.

An electronic apparatus 10A is a tablet computer used by user A. An electronic apparatus 10B is a tablet computer used by user B. An electronic apparatus 10C is a tablet computer used by user C. Each of the electronic apparatuses 10A, 10B, and 10C includes a function equivalent to that of the tablet computer 10 of the present embodiment.

The electronic apparatuses 10A, 10B, and 10C are connected to each other via a wired network or a wireless network. It is hereinafter assumed that mutual connections of the electronic apparatuses 10A, 10B, and 10C via a wireless network are established. An arbitrary wireless connection standard whereby apparatuses can be connected to each other wirelessly can be employed as a method of wirelessly connecting the two apparatuses mutually. For example, Wi-Fi Direct (registered trademark), Bluetooth (registered trademark), etc., may be used. In an example shown in FIG. 2, the electronic apparatus 10A and the electronic apparatus 10B are connected via a wireless network, and the electronic apparatus 10A and the electronic apparatus 100 are connected via a wireless network.

Any one of the electronic apparatuses 10A, 10B, and 100 can function as a server configured to manage the handwriting sharing service. The owner's electronic apparatus may play a part of the server. The owner corresponds to the host of the handwriting sharing service.

The server may determine whether each electronic apparatus requesting participation in the handwriting sharing service is permitted to participate in the handwriting sharing service (group), that is, to log into the handwriting sharing service. Only the apparatus (terminal) which has received permission to participate (log in) from the server may be permitted to log into the handwriting sharing service, that is, to participate in the group.

As a method for enabling each apparatus (terminal) to log into the handwriting sharing service, a method of logging into the handwriting sharing service with an ID (account) of the apparatus is employed. Alternatively, a method of logging into the handwriting sharing service with an ID (account) of the user using the apparatus may be employed. In other words, login and logout of the handwriting sharing service may be either those using the ID (account) of the electronic apparatus or those using the ID (account) of the user.

Now, a case where the electronic apparatuses 10A, 10B, and 10C have logged into the handwriting sharing service, that is, the electronic apparatuses 10A, 10B and 10C are participating in a group of the same handwriting sharing service, is assumed. A handwriting shared screen (canvas) for viewing the shared handwritten information is displayed in each of the electronic apparatuses 10A, 10B, and 100. The handwriting shared screens (canvases) are used as display areas common to the electronic apparatuses 10A, 10B, and 100. The handwriting shared screens (canvases) enable visual communication among the electronic apparatuses 10A, 10B, and 100. The visual communication enables various objects including handwritten information to be exchanged between the apparatuses.

The stroke data input by handwriting by each of the users A, B, and C to his or her own electronic apparatus is not only displayed on the handwriting shared screen (canvas) of his or her own electronic apparatus, but also reflected in real time on the handwriting shared screens (canvases) of the electronic apparatuses of the other users. Consequently, the stroke data (handwritten characters, handwritten graphics, etc.) input by handwriting by each of the users A, B, and C can be exchanged and shared among the users A, B, and C.

Further, the electronic apparatuses 10A, 10B, and 100 can display the same content such as meeting materials or teaching materials on the shared screens (canvases). In this case, a stroke input by handwriting in each of the electronic apparatuses is displayed on the content. The users A, B, and C can exchange and share the characters, graphics, etc., handwritten on the content among the users A, B, and C, while viewing the same content.

Figures 3, 4:
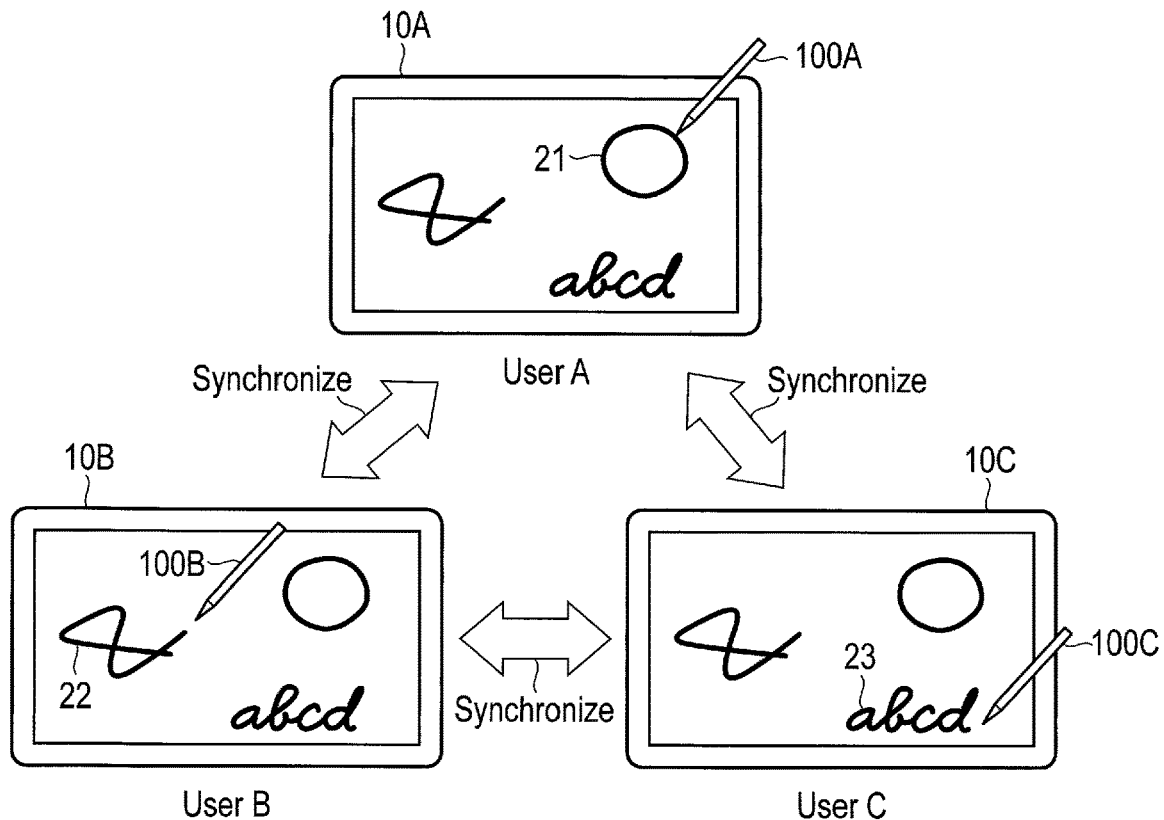
FIG. 3 is an illustration showing an example in which the same screen (canvas) is shared among electronic apparatuses.
FIG. 4 is an illustration showing an example of the relationship between each stroke on the screen (canvas) on which handwritten information is shared among the electronic apparatuses and the writer.

FIG. 3 shows an example in which the same canvas is shared among the electronic apparatuses 10A, 10B, and 100.

In the handwriting sharing service, the electronic apparatus 10A and the electronic apparatus 10B are wirelessly connected to each other, and the electronic apparatus 10A and the electronic apparatus 100 are wirelessly connected to each other. Further, the handwriting sharing service realizes making simultaneous handwriting on the same canvas by multiple users by synchronizing screen displays and handwriting operations on the respective terminals.

On the canvases of the respective electronic apparatuses 10A, 10B, and 100, the same strokes 21, 22 and 23 are displayed. As shown in FIG. 4, the stroke 21 is a stroke input by handwriting in the electronic apparatus 10A by the user A. The stroke 22 is a stroke input by handwriting in the electronic apparatus 10B by the user B. The stroke 23 is a stroke input by handwriting in the electronic apparatus 100 by the user C.

FIG. 5 shows an example of the handwriting shared screen (canvas). A canvas 30A of each of the electronic apparatuses is a handwriting area. A stroke handwritten by each user is displayed on this canvas 30A. Content such as the teaching materials may be displayed on the canvas 30A. In this case, a stroke of each user is drawn on this content. In addition, in accordance with the user's input, characters, graphics, images, etc., may be displayed on the canvas 30A.

For example, on the canvas 30A of the electronic apparatus 10B, each of strokes 40 input by handwriting on the canvas 30A by the user B with a stylus 100B is displayed. Further, on the canvas 30A, strokes input by handwriting in the other electronic apparatuses 10A and 100, respectively, are displayed. The strokes input by handwriting in the other electronic apparatuses, respectively, include strokes 42 input by handwriting in the electronic apparatus 10C by the user C, and strokes 44 input by handwriting in the electronic apparatus 10A by the user A.

Next, stroke data will be described with reference to FIG. 6.

In FIG. 6, a case where a handwritten character string "ABC" is written in the order of "A", "B", and "C" is assumed.

The handwritten character "A" is represented by two strokes (a path in the shape of "Λ" and a path in the shape of "-") which are input by hand with the stylus 100, etc.

While the stylus 100 is moving, the path of the stylus 100 in the shape of "Λ" is sampled in real time. Point data items (coordinate data items) PD11, PD12, . . . , PD1$m$ corresponding to respective points on the path of the stylus 100 in the shape of "Λ" are thereby acquired successively. For example, whenever the position of the stylus 100 on the screen moves by a particular amount, a point data item indicative of a new position may be acquired. Although the density of point data items shown is low in FIG. 7 for simplicity of the illustration, point data items are actually acquired in higher density. These point data items PD11, PD12, . . . , PD1$m$ are used to draw the path of the stylus 100 in the shape of "Λ" on the screen. The path of the stylus 100 in the shape of "Λ" is drawn in real time on the screen so as to follow the movement of the stylus 100.

Similarly, a path of the stylus 100 in the shape of "-" is also sampled in real time while the stylus 100 is moving. Point data items (coordinate data items) PD21, PD22, . . . , PD2$n$ corresponding to respective points on the path of the stylus 100 in the shape of "-" are thereby acquired successively.

The handwritten character "B" is represented by two strokes handwritten by using the stylus 100 or the like. The handwritten character "C" is represented by a single stroke handwritten by using the stylus 100 or the like.

Figure 7:
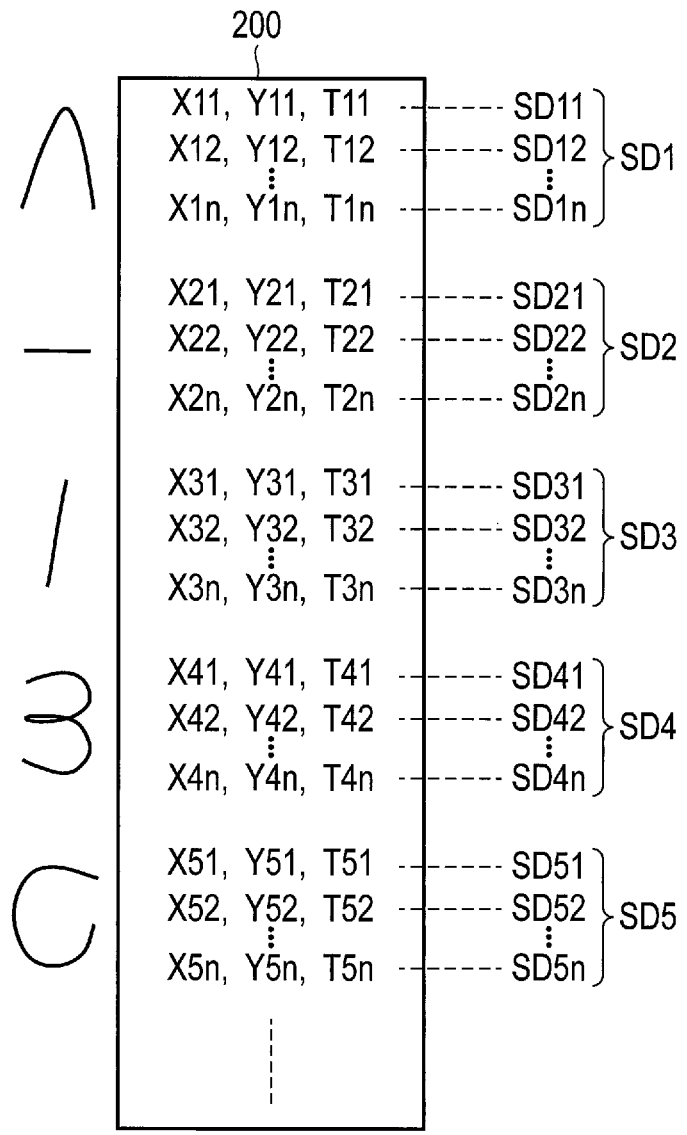
FIG. 7 is an illustration showing an example of time-series information corresponding to the handwritten document of FIG. 6.

FIG. 7 shows time-series information 200 corresponding to the handwritten character string shown in FIG. 6. The time-series information 200 includes items of stroke data SD1, SD2, . . . , SD5. In the time-series information 200, these items of stroke data SD1, SD2, . . . , SD5 are arranged in the order of writing, that is, in chronological order of strokes handwritten.

In the time-series information 200, the first two items of stroke data SD1 and SD2 represent the two strokes of the handwritten character "A", respectively. The third and the fourth items of stroke data SD3 and SD4 represent the two strokes that constitute the handwritten character "B", respectively. The fifth item of stroke data SD5 represents a single stroke that constitutes the handwritten character "C".

The stroke data includes coordinates corresponding to points on the path of one stroke, respectively. In the respective items of stroke data, coordinates are arranged chronologically in the order of strokes written. For example, with respect to the handwritten character "A", stroke data SD1 includes coordinate data sequences (time-series coordinates) corresponding to the points on the path of the "Λ" stroke of the handwritten character "A", that is, n items of coordinate data SD11, SD12, . . . , SD1$n$. Stroke data SD2 includes coordinate data sequences corresponding to the points on the path of the "-" stroke of the handwritten character "A", that is, n items of coordinate data SD21, SD22, . . . , SD2$n$. Note that the number of items of coordinate data may be different from one stroke data item to another.

Each item of coordinate data indicates an X-coordinate and a Y-coordinate corresponding to a certain point in the associated path. For example, coordinate data SD11 indicates the X-coordinate (X11) and the Y-coordinate (Y11) of the starting point of the "Λ" stroke. SD1$n$ indicates the X-coordinate (X1$n$) and the Y-coordinate (Y1$n$) of the end point of the "Λ" stroke.

Further, each item of coordinate data may include time stamp information T representing the point of time when a point corresponding to the coordinates was handwritten. The point of time at which the point was handwritten may be either an absolute time (for example, year, month, day, hour, minute, and second), or a relative time with reference to a certain point in time. For example, the absolute time (for example, year, month, day, hour, minute, and second) when a stroke was started to be written may be added to each item of stroke data as time stamp information. In addition, the relative time indicative of a difference from the absolute time may be added as time stamp information T to each item of coordinate data in the stroke data.

Furthermore, information (Z) indicative of a writing pressure may be added to each item of coordinate data.

Figure 8:
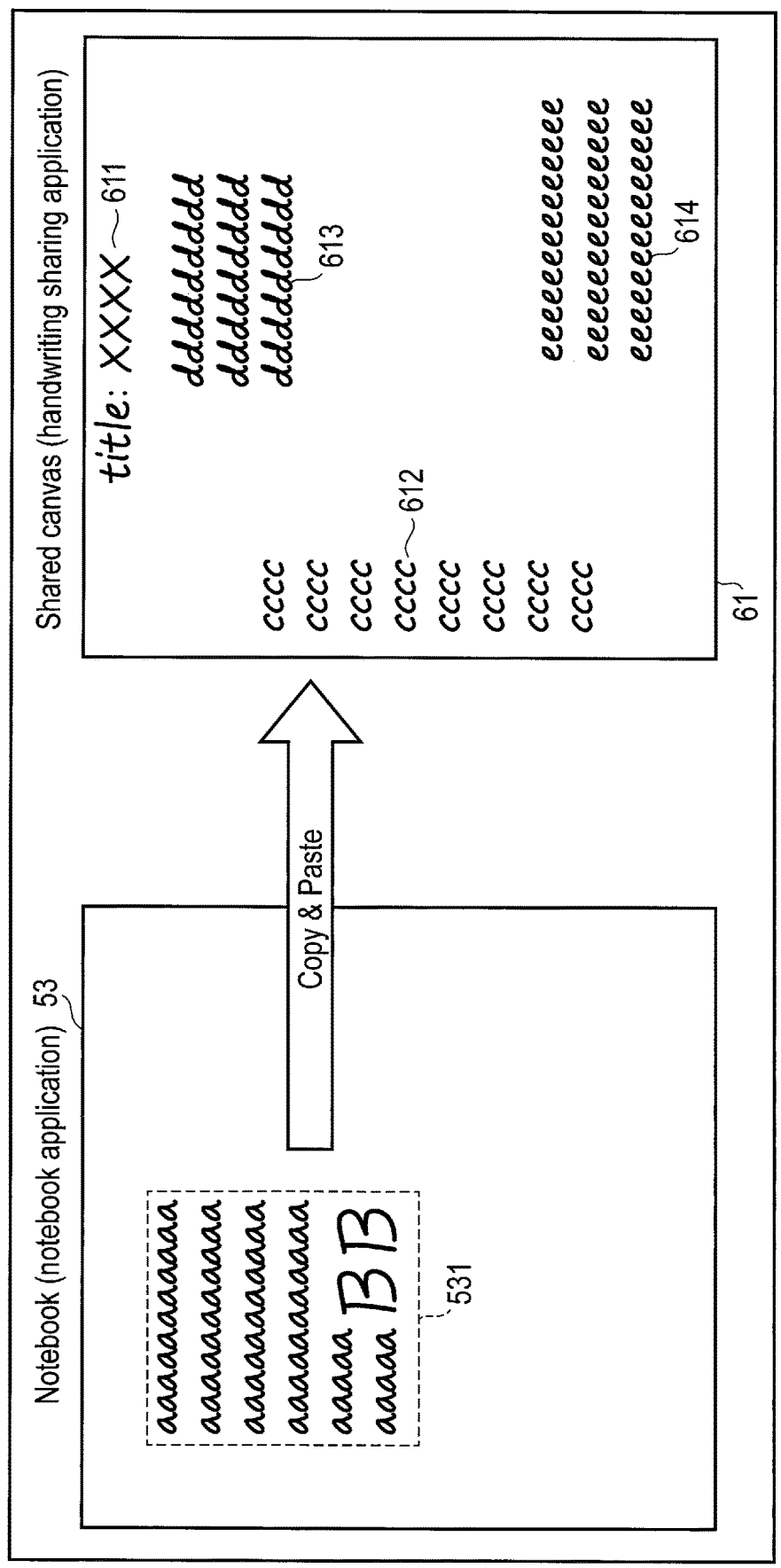
FIG. 8 is an illustration for explaining an example in which a copied object is pasted onto the screen (canvas) on which the handwritten information is shared among the electronic apparatuses.

As shown in FIG. 8, on a screen where a canvas 61 shared among electronic apparatuses is displayed, a copy-and-paste operation for copying a rendered object 531 (for example, handwritten strokes) and pasting the copied object 531 onto the canvas 61 may be performed. On the canvas 61, objects 611 to 614, such as handwritten strokes input to the electronic apparatuses used by the respective users, have already been rendered. In addition, the object 531 to be copied is one rendered within a view (a second view) 53 displayed by using, for example, another application program (for example, a notebook application program).

The user can copy the object 531 included in a specified area by performing an operation of specifying the area for selecting the object 531 in the view 53 and then performing an operation of instructing the copying of that area through the touchscreen display. Data on the copied object 531 is saved in a particular storage area called a clipboard.

Further, as the user performs an operation of instructing the pasting of the copied object 531 (that is, the data saved in the clipboard) onto the canvas 61, the object 531 can be pasted onto the canvas 61.

Figure 9:
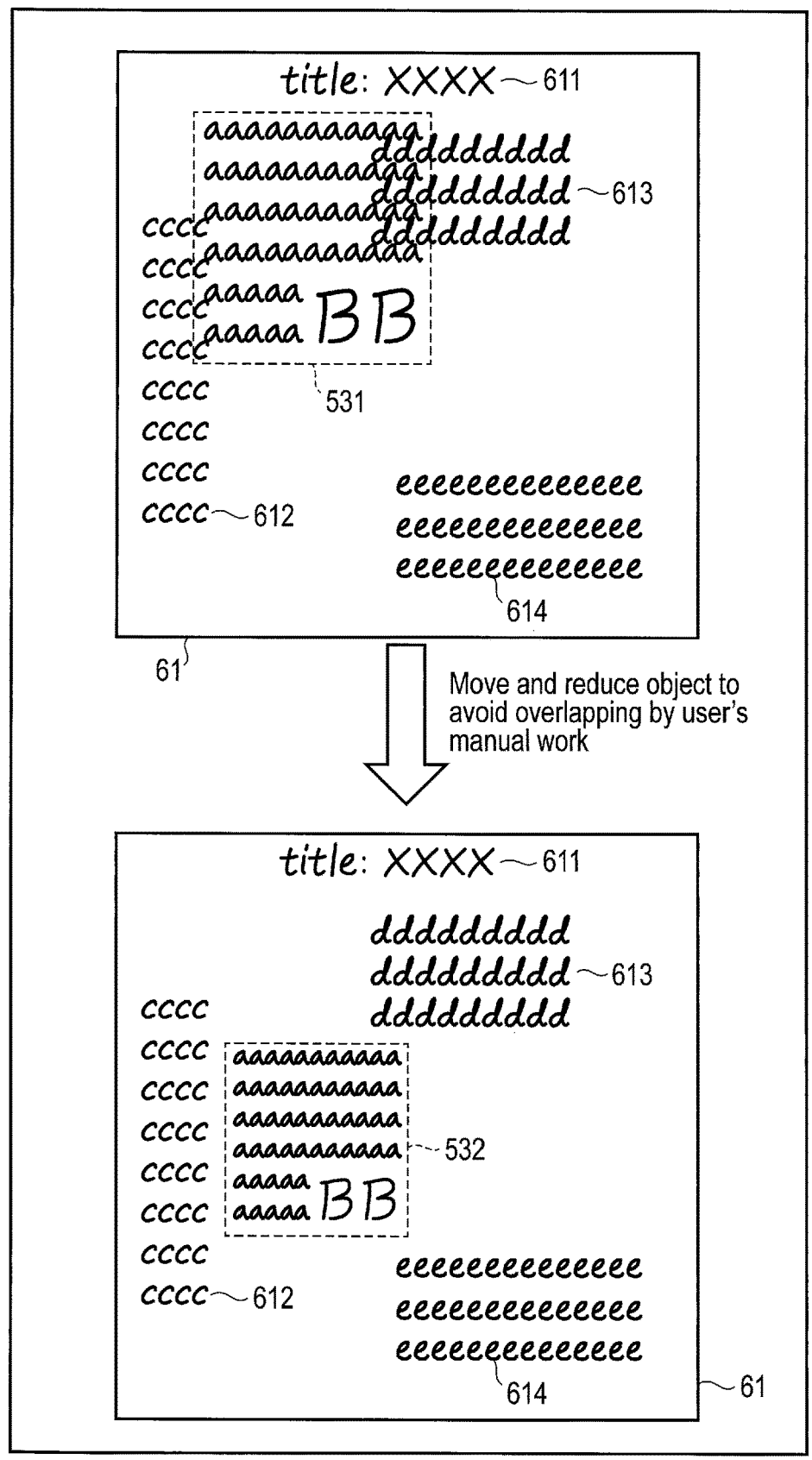
FIG. 9 is an illustration for explaining an example in which the object of FIG. 8 is moved and reduced by the user's operation.

As shown in FIG. 9, there may be a case where the pasted object 531 overlaps the objects 611, 612, and 613 already rendered on the canvas 61. In this case, the user performs an operation of reducing and moving the object 531, thereby allocating the reduced object 532 to, for example, a position where it does not overlap the objects 611 to 614 on the canvas 61. In this way, it is possible to prevent visibility of the objects 611 to 614 already rendered on the canvas 61 from being reduced by the pasted object 531.

However, such an operation is very troublesome for the user. In addition, if such an operation is carried out on the canvas 61 that is shared in real time, the other users may be obstructed in making inputs to their canvases 61, and the convenience of the canvas 61 may be deteriorated.

Accordingly, the tablet computer 10 of the present embodiment has a paste adjustment function of automatically pasting a copied (or cut) object into a blank area where the object does not overlap an object (or objects) already rendered on a shared canvas in accordance with a copy-and-paste operation (or a cut-and-paste operation). By this function, the copied object can be pasted into a blank area where it does not overlap the object (or objects) already rendered on the shared canvas without requiring the user to perform the operation of adjusting the position or size of the object.

FIG. 10 shows a system configuration of the tablet computer 10. As described above, the tablet computer 10 can operate as any of the electronic apparatuses 10A, 10B, and 100.

The tablet computer 10 includes a CPU 101, a system controller 102, a main memory 103, a graphics processing unit (GPU) 104, a BIOS-ROM 105, a nonvolatile memory 106, a wireless communication device 107, an embedded controller (EC) 108, etc.

The CPU 101 is a processor for controlling the operation of various components in the tablet computer 10. The processor includes a circuit (a processing circuit). The CPU 101 executes various programs loaded from the nonvolatile memory 106, which is a storage device, to the main memory 103. These programs include an operating system (OS) 201 and various application programs. The application programs include a handwriting sharing application program 202. The CPU 101 executes instructions included in the handwriting sharing application. The handwriting sharing application program 202 includes share instructions for sharing a canvas among electronic apparatuses. Various objects such as handwritten information (handwritten strokes), characters, graphics, and images are rendered on the canvas in accordance with operations of the users using the respective electronic apparatuses. As described above, the handwriting sharing application program 202 also includes paste adjustment instructions for adjusting the object which is pasted onto the canvas in accordance with the copy-and-paste operation or the cut-and-paste operation.

In addition, the application programs may include a notebook application program 203, word processing software, paint software, presentation software, etc. The notebook application program 203 includes instructions for creating and editing a document including handwritten information (handwritten strokes), characters, graphics, images, and the like.

Further, the CPU 101 executes a basic input/output system (BIOS) stored in the BIOS-ROM 105. The BIOS is a program for hardware control.

The system controller 102 is a device for connecting between a local bus of the CPU 101 and the various components. In the system controller 102, a memory controller for access controlling the main memory 103 is also integrated. In addition, the system controller 102 has the function of communicating with the graphics processing unit (GPU) 104 via a serial bus conforming to the PCI EXPRESS standard.

The GPU 104 is a display processor (a display control circuit) which controls an LCD 17A used as a display monitor of the tablet computer 10. A display signal generated by the GPU 104 is transmitted to the LCD 17A. The LCD 17A displays a screen image based on the display signal. On an upper surface side of the LCD 17A, a touchpanel 17B is disposed. On a lower surface side of the LCD 17A, a digitizer 17C is disposed. The touchpanel 17B is a capacitive pointing device configured to input data on a screen of the LCD 17A. A contact position on the screen touched by a finger, movement of the contact position, etc. are detected by the touchpanel 17B. The digitizer 17C is an electromagnetic induction pointing device configured to input data on the screen of the LCD 17A. A contact position on the screen touched by the stylus 100, movement of the contact position, etc. are detected by the digitizer 17C.

The wireless communication device 107 is a device configured to execute wireless communication. The wireless communication device 107 includes a transmitter 107T which wirelessly transmits a signal, and a receiver 107R which wirelessly receives a signal. The EC 108 is a single-chip microcomputer including an embedded controller for power management. The EC 108 has the function of powering on or off the tablet computer 10 in accordance with the power button operation by the user.

Figure 11:
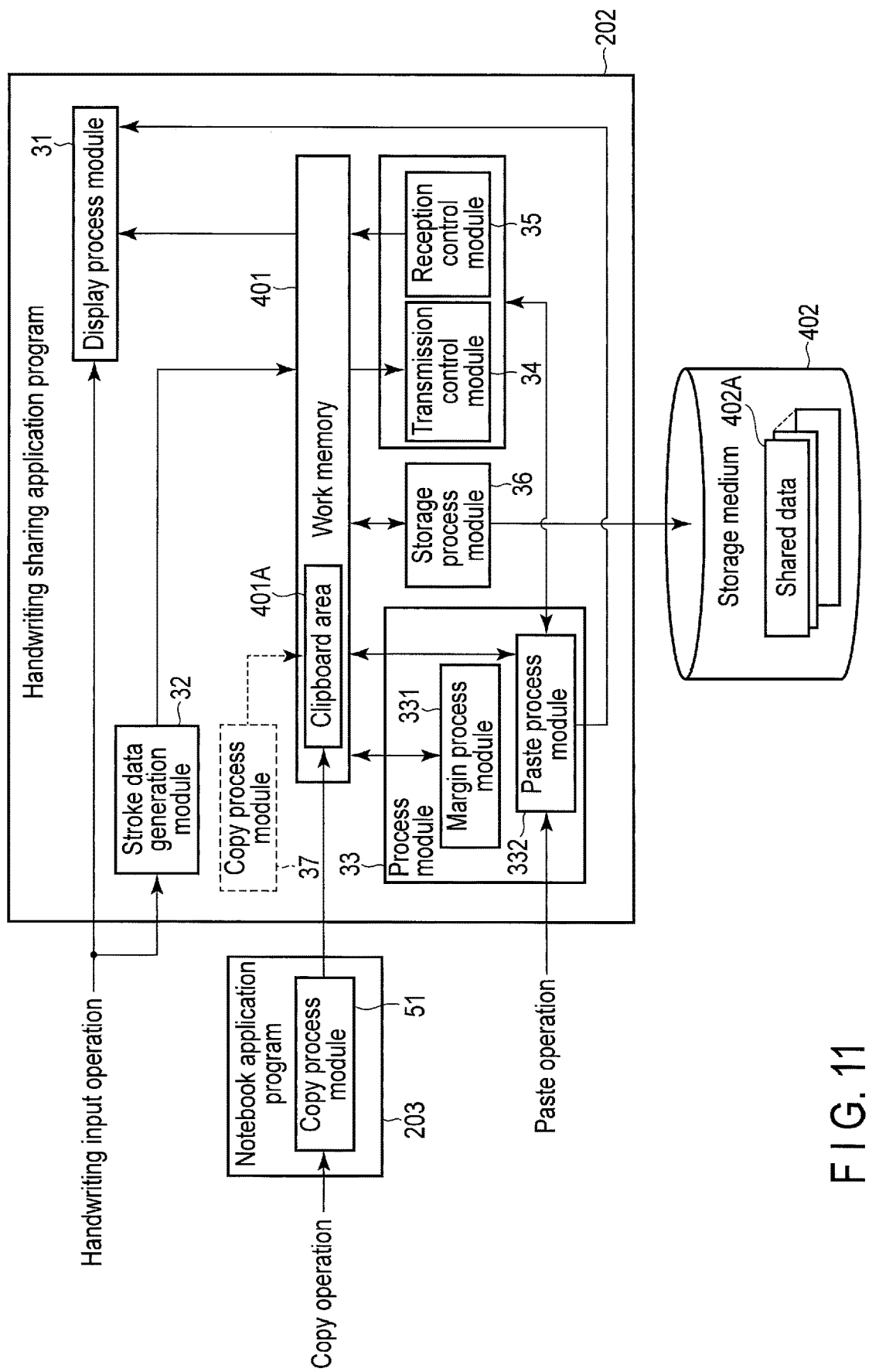
FIG. 11 is an exemplary block diagram showing a functional configuration of a handwriting sharing application program executed by the electronic apparatus of the embodiment.

Next, a configuration of the handwriting sharing application program 202 will be described with reference to FIG. 11. The handwriting sharing application program 202 includes a display process module 31, a stroke data generation module 32, a process module 33, a transmission control module 34, a reception control module 35, a storage process module 36 etc., as function execution modules for sharing handwritten information (canvas) between the tablet computer 10 and at least one other electronic apparatus (hereinafter also referred to as an external electronic apparatus).

The display process module 31 includes instructions for displaying the canvas (document) shared between the tablet computer 10 and at least one other electronic apparatus on the screen of the LCD 17A. The display process module 31 includes instructions for displaying at least a part of the canvas (hereinafter referred to as a first view) on the screen in accordance with the size of the screen and the operation of enlarging or reducing the canvas. That is, the entire canvas on the screen or a part of the canvas can be displayed on the screen. The first view is a part of the screen image (canvas) created by using the handwriting sharing application program 202, and is an area displayed on the LCD 17A. A portion displayed on the screen of the entire canvas is freely changed in accordance with the user's operation (for example, a flick operation).

The display process module 31 includes instructions for rendering various objects such as handwritten strokes, characters, graphics, and images on the first view (canvas) in accordance with the user's operation. The display process module 31 includes instructions for displaying, for example, the first view which is a part of a document shared between the tablet computer 10 and the at least one other electronic apparatus, and in which first handwritten strokes input by the tablet computer 10 and the at least one other electronic apparatus are drawn, on the screen.

More specifically, on the first view (canvas), a handwritten stroke can be drawn (displayed) in accordance with the user's input operation. The touchscreen display 17 (the digitizer 17C or the touchpanel 17B) is configured to detect an occurrence of an event such as touch, move (slide), and release. A touch is an event indicating that an external object has touched the screen. A move (slide) is an event indicating that a contact position has moved while the external object remains in contact with the screen. A release is an event indicating that the external object has been separated from the screen.

The display process module 31 and the stroke data generation module 32 include instructions for receiving the "touch", "move (slide)" or "release" event generated by the touchscreen display 17, thereby detecting an input operation. The touch event includes the coordinates of a contact position. The move (slide) event includes the coordinates of a contact position at a moving destination. The release event includes the coordinates of a position at which the contact position is separated from the screen. Accordingly, the display process module 31 and the stroke data generation module 32 include instructions for receiving a coordinate sequence corresponding to a path of movement of the contact position from the touchscreen display 17.

The display process module 31 includes instructions for drawing a handwritten stroke input on the screen of the touchscreen display 17 on the first view (canvas). The display process module 31 includes instructions for receiving the coordinate sequence from the touchscreen display 17, and rendering a path of each stroke handwritten by the input operation using the stylus 100, etc., based on this coordinate sequence, in the first view.

The stroke data generation module 32 includes instructions for receiving the aforementioned coordinate sequence output from the touchscreen display 17, and generating time-series information (stroke data) having the structure as described in detail in FIG. 7, based on this coordinate sequence. In this case, the time-series information, that is, the coordinates corresponding to individual points of the stroke, the time stamp information, and pressure may be stored temporarily in a work memory 401.

The transmission control module 34 and the reception control module 35 include instructions for exchanging data for sharing the canvas between the electronic apparatuses which use the handwriting sharing service. The transmission control module 34 and the reception control module 35 include instructions for performing a process according to the role of the tablet computer 10, that is, whether the tablet computer 10 corresponds to an owner or a client of the handwriting sharing service.

First, a case where the tablet computer 10 corresponds to the owner of the handwriting sharing service will be described.

The transmission control module 34 includes instructions for transmitting the generated stroke data to the external electronic apparatus, which is the client of the handwriting sharing service. The external electronic apparatus receives the stroke data, and draws a handwritten stroke based on the received stroke data on the canvas on the screen of the display provided in this apparatus.

The reception control module 35 includes instructions for receiving the stroke data from the external electronic apparatus, which is the client of the handwriting sharing service. The display process module 31 includes instructions for drawing a handwritten stroke based on the received stroke data on the canvas. Further, the transmission control module 34 includes instructions for transmitting the received stroke data to another external electronic apparatus, which is also the client of the handwriting sharing service.

Next, a case where the tablet computer 10 corresponds to the client of the handwriting sharing service will be described.

The transmission control module 34 includes instructions for transmitting the generated stroke data to the external electronic apparatus, which is the owner of the handwriting sharing service. This external electronic apparatus receives the stroke data, and draws a handwritten stroke based on the received stroke data on the canvas on the screen of the display provided in the external electronic apparatus. Further, the external electronic apparatus, which is the owner, transmits the received stroke data to another (second) external electronic apparatus, which is also the client of the handwriting sharing service. This second client external apparatus receives the stroke data, and draws a handwritten stroke based on the received stroke data on the canvas on the screen of the display provided in the second client external electronic apparatus.

The reception control module 35 includes instructions for receiving the stroke data from the external electronic apparatus, which is the owner of the handwriting sharing service. This stroke data is data generated by the owner external electronic apparatus or the second client external electronic apparatus. The display process module 31 includes instructions for drawing a handwritten stroke based on the received stroke data on the canvas.

By the above process, the canvas on which the same handwritten strokes are drawn can be displayed in each of the electronic apparatuses which participate in the handwriting sharing service (group).

Also, the display process module 31 includes instructions for rendering characters, graphics, and images, etc., on the canvas, in accordance with operations such as allowing the user to input characters by using a keyboard (including a software keyboard), or arranging the graphics or images on the first view (canvas).

The transmission control module 34 and the reception control module 35 includes instructions for performing transmission and reception of data indicative of the characters, graphics, and images, rendered on the canvas between the electronic apparatuses which use the handwriting sharing service in the same way as for the exchange of stroke data described above. The display process module 31 includes instructions for rendering characters, graphics, and images, etc., on the canvas based on the data received from the external electronic apparatuses.

The storage process module 36 includes instructions for causing a storage medium 402 to store data on objects such as handwritten strokes, characters, graphics, and images rendered on the canvas. The storage process module 36 includes instructions for generating a record of shared data 402A by using, for example, the data on each object (for example, stroke data corresponding to a handwritten stroke, character code data corresponding to a character, graphics data, and image data), and adding the generated record to the shared data 402A stored in the storage medium 402.

As described above, since the canvas on which the same objects are rendered can be displayed in each of the electronic apparatuses which participate in the handwriting sharing service (group), the canvas (screen) can be shared among the group.

FIG. 12 shows an example of a structure of the shared data 402A. The shared data 402A includes records corresponding to objects rendered on the canvas. Each record includes, for example, an object ID field, a user ID field, an object data field, a coordinates field, a size field, and a time field. In a record corresponding to a certain object, the object ID field indicates identification data imparted to that object. The user ID field indicates identification data imparted to the user who has input that object. Note that identification data imparted to the electronic apparatus to which the object has been input (i.e., the device ID) may be used instead of the user ID. The object data field indicates data on the object. The coordinates field indicates a position on the canvas on which the object is rendered. The size field indicates the size of the object displayed (rendered). The time field indicates the time at which the object is rendered (input), or the time at which the object is received from the other electronic apparatus.

Also, as shown in the example illustrated in FIG. 8, the process module 33 and the display process module 31 include instructions for performing, when an operation for pasting a first object onto the first view (canvas) 61 is carried out after an operation for copying or cutting the first object rendered on the screen of the LCD 17A by the user, the process for pasting (rendering) the object onto the first view 61. The first object is, for example, an object 531 rendered in the second view 53. The second view 53 is a part of a screen image generated by using an application program (for example, the notebook application program 203) which is different from the handwriting sharing application program 202, and is an area displayed in the LCD 17A. Alternatively, the first object may be an object rendered on the first view (canvas) 61. The process module 33 and the display process module 31 include instructions for determining, for example, whether a first blank area into which the first object 531 can be pasted exists in the first view 61 displayed on the screen of the LCD 17A, based on an area in which the first handwritten strokes 611 to 614 are not rendered. If it is determined that the first blank area exists, the first object is rendered in the first blank area.

More specifically, a copy process module 51 includes instructions for saving, when an operation for copying (or cutting), for example, the first object 531 in the second view 53 displayed on the screen by using the notebook application program 203 is performed, the data on the first object 531 in a clipboard area 401A in the work memory 401. The clipboard area 401A is a storage area in which data instructed to be copied (or cut) is temporarily stored, and is provided in, for example, the main memory 103. The first object 531 may also include a handwritten stroke, a character, graphics, or an image, or a combination thereof.

Note that the first object to be copied may be an object on the first view (canvas). In that case, in accordance with an operation for copying the first object in the first view 61, a copy process module 37 includes instructions for saving the data on the first object in the clipboard area 401A within the work memory 401.

The process module 33 includes instructions for performing the process for pasting the copied object 531 onto the canvas 61. The process module 33 includes a margin process module 331 and a paste process module 332.

The margin process module 331 includes instructions for performing a process for adding a margin to the object 531 based on the data saved in the clipboard area 401A, in accordance with detection of a paste operation. Note that the margin process module 331 may include instructions for performing a process for adding a margin to the object 531 in accordance with storage of the data on the object 531 in the clipboard area 401A.

FIG. 13 shows an example in which a margin is added to the copied object 531. According to the instructions of the margin process module 331, margins 541 to 544 of a particular size are added on the top, bottom, right, and left of the object 531, for example. This is done in order to prevent the object from being hard to see by avoiding the object 531 from adjoining another object already rendered on the canvas 61 when the object 531 is pasted onto the canvas 61. Accordingly, an area including the object 531 and the margins 541 to 544 is treated as an object 54 to be pasted onto the canvas 61. The data on the object 54 is saved in the work memory 401.

Further, the paste process module 332 includes instructions for performing a process for pasting the object 54 onto the canvas 61 by using the data on the object 54 stored in the work memory 401. The paste process module 332 includes instructions for searching for a blank area into which the object 54 can be pasted with the first view (canvas) 61 displayed on the screen treated as a search area (a search range).

More specifically, the paste process module 332 includes instructions for detecting an area corresponding to an object already rendered on the first view (canvas) 61 displayed on the screen (hereinafter also referred to as an existing object area). As shown in FIG. 14, the paste process module 332 includes instructions for detecting areas 611A to 614A corresponding to objects 611 to 614 already rendered on the first view 61. The paste process module 332 includes instructions for detecting, when a rendered object corresponds to handwritten strokes, for example, a circumscribed rectangle including a block of handwritten strokes input successively as an area corresponding to the object. The paste process module 332 may include instructions for reading records associated with the respective objects 611 to 614 rendered on the canvas 61 from the shared data 402A. Then, the paste process module 332 may include instructions for setting the coordinates indicative of the position of the detected existing object area (for example, the coordinates of the upper left end of the area) to the coordinates field of the corresponding record, and the size of the existing object area to the size field.

The paste process module 332 includes instructions for searching for a blank area allowing the object 54 to be pasted in the first view (canvas) 61, based on an area which does not correspond to the detected existing object areas 611A to 614A in the first view 61. The paste process module 332 includes instructions for raster scanning the first view 61, for example, thereby determining whether an interest region set within the first view 61 includes a blank area into which the object 54 can be pasted. The determination is performed repeatedly for interest regions that can be obtained by shifting an interest region on the first view 61 by one pixel by one pixel, for example. The interest region is, for example, an area having the same size as the object 54. The raster scan may be performed from an upper left end of a search area, or may be performed from a position where the user has input the other object such as a handwritten stroke at the last or its nearby position. Also, the paste process module 332 may include instructions for setting, in accordance with a change in the degree of overlap between a certain interest region and the existing object area and the degree of overlap between the next interest region and the existing object area, a yet another interest region. The paste process module 332 includes instructions for performing, if a change in the degrees of overlap is small, for example, the above-described determination for the next interest region at a position determined by shifting greatly (for example, by shifting ten pixels) from the position of the current interest region on the search area. The paste process module 332 includes instructions for performing, if a change in the degrees of overlap is great, the above-described determination for the next interest region at a position determined by shifting a little (for example, by shifting one pixel) from the position of the current interest region on the search area.

As a result of the search, the paste process module 332 includes instructions for determining, if a blank area allowing the object 54 to be pasted is found in the first view (canvas) 61, that the blank area as being a paste area of the object 54. The display process module 31 includes instructions for rendering the object 54 in the determined paste area of the canvas 61.

Meanwhile, the paste process module 332 includes instructions for searching for, if a blank area into allowing the object 54 to be pasted is not found in the first view 61, a paste area by the aforementioned raster scan by sequentially reducing the object 54. The paste process module 332 includes instructions for reducing the object 54 by a particular ratio (for example, ten percent). The paste process module 332 includes instructions for searching for a blank area allowing the reduced object 54 to be pasted, in the first view 61.

The paste process module 332 includes instructions for determining, if a blank area allowing the reduced object 54 to be pasted is found in the first view 61, that the blank area as being a paste area of the reduced object 54. The display process module 31 includes instructions for rendering the reduced object 54 in the determined paste area. Further, the paste process module 332 includes instructions for reducing, if a blank area allowing the reduced object 54 to be pasted is not found in the first view 61, the object 54 even more by the particular ratio and repeating the process of searching for a blank area into which the reduced object 54 can be pasted.

The paste process module 332 may include instructions for selecting, if plural blank areas allowing the pasting are obtained from the first view (canvas) 61 by the process of searching for a blank area allowing the object 54 to be pasted, an area from among the obtained blank areas. The selected area is, for example, the area having the largest size, the area closest to the center of the first view 61, or the area having the greatest distance from the existing object areas 611A to 614A.

In the example shown in FIG. 15, by the above-described process, an object 55 obtained by reducing the object 54 is rendered on a blank area which does not overlap the existing object areas 611A to 614A on the first view (canvas) 61. The object 55 includes an object main body 553 and margins 551 to 554. Since the margins 551 to 554 prevent the object main body 553 from adjoining the existing object areas 611A to 614A, the user can easily identify a block for each of the objects.

Note that the paste area of the object 54 may be searched from an area specified by the user within the first view 61 instead of the whole first view (canvas) 61.

Figure 16:
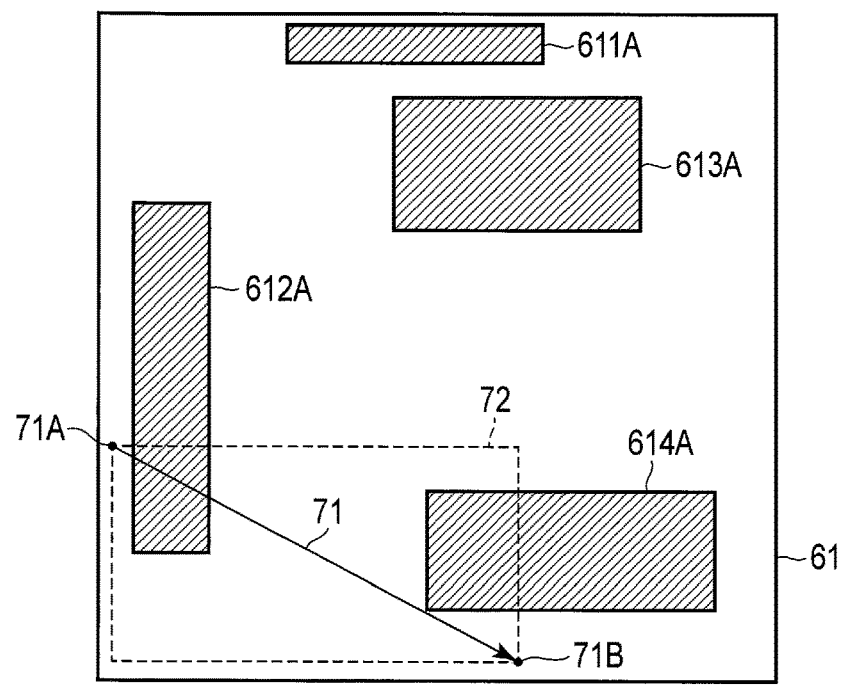
FIG. 16 is an illustration showing an example of setting an area from which an area into which the object is to be pasted is searched in accordance with the user's operation by the electronic apparatus of the embodiment.
Figure 17:
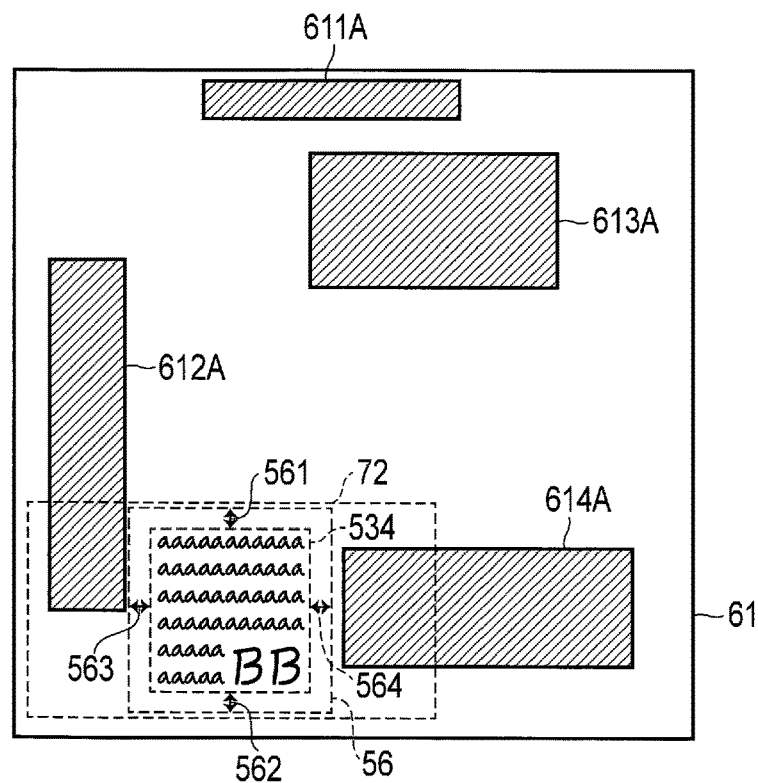
FIG. 17 is an illustration showing an example in which the object is pasted within a search area of FIG. 16.

FIGS. 16 and 17 show an example in which a search area (a search range) in which a paste area of an object is searched is set in accordance with the user's operation.

As shown in FIG. 16, according to the instructions of the paste process module 332, a rectangular area is set based on a starting point 71A and an end point 71B of a stroke (path) 71 input via the touchscreen display 17 to a search area 72. According to the instructions of the display process module 31, a rectangle may be preview-displayed based on the starting point 71A and the end point 71B while the stroke 71 is being input. For example, according to the instructions of the display process module 31, a dotted frame corresponding to this rectangle may be drawn.

According to the instructions of the paste processor module 332, when the input of the stroke 71 is completed, a blank area allowing the object 54 to be pasted is searched for within the search area 72 based on the stroke 71. A blank area into which the object 54 can be pasted without overlapping the areas 612A and 614A corresponding to the objects 612 and 614 already rendered in the first view 61 is searched for within the search area 72. If such an area is not found, the object 54 is reduced by a particular ratio, and a blank area into which the reduced object 54 can be pasted without overlapping the areas 612A and 614A corresponding to the objects 612 and 614 is searched for within the search area 72.

As shown in FIG. 17, an object 56 obtained by reducing the object 54 is pasted into a blank area which does not overlap the areas 612A and 614A corresponding to the objects 612 and 614 already rendered in the first view 61, within the set search area 72. Since the object 56 includes margins 561 to 564, in addition to an object main body 534, the object 534 is not in close contact with the areas 612A and 614A of the already rendered objects 612 and 614. Therefore, the object 534 can be pasted to be easily seen.

Further, as shown in FIGS. 18 and 19, information regarding an object to be pasted can be preview-displayed in accordance with a stroke (path) for specifying the search area while this stroke is being input.

In an example shown in FIG. 18, according to the instructions of the paste process module 332 and the display process module 31, a rectangle 752 is drawn within a rectangular area 751 based on a starting point 75A and an end point 75B of a stroke 75 input via the touchscreen display 17. The rectangle 752 shows the maximum size which allows the object 54 (that is, the object of data stored in the work memory 401) to be pasted. For example, a dotted frame corresponding to this rectangle 752 is drawn.

In addition, as shown in FIG. 19, according to the instructions of the paste process module 332 and the display process module 31, an object 761 having the maximum size to be pasted within the rectangular area 751 may be rendered. The object 761 is, for example, an object generated by reducing the object 54, which is instructed to be pasted, in accordance with the size of the rectangular area 751.

As described above, if a blank area into which the reduced object 54 can be pasted is not found in the first view (canvas) 61, the process of further reducing the reduced object 54 by a particular ratio and searching for a blank area into which the further reduced object 54 can be pasted until a blank area which allows the pasting is found is repeated. However, if no blank area which allows the pasting is found even if the object 54 is reduced to a particular reduction ratio (for example, thirty percent), a paste area of the object 54 is not determined. If a paste area of the object 54 is not determined (that is, if it is determined that no blank area into which the object 54 can be pasted exists in the first view (search area) 61), the object 54 is not rendered in the first view 61.

For example, if the ratio of the size of the reduced object 54 to the size of the object 54 is less than or equal to a threshold value, the object 54 is not rendered in the first view 61. On the other hand, if the ratio is greater than the threshold value, it is determined whether a second blank area into which the reduced object 54 can be pasted exists in the first view 61 by the above-described process of searching for a blank area into which an object can be pasted from the first view 61. If it is determined that the second blank area exists, the reduced object 54 is rendered in the second blank area.

Further, according to the instructions of the display process module 31, if a paste area of the object 54 is not determined (that is, if it is determined that no blank area into which the object 54 can be pasted exists in the first view (search area) 61), the object 54 in an editable state may be displayed in the first view 61.

Figure 20:
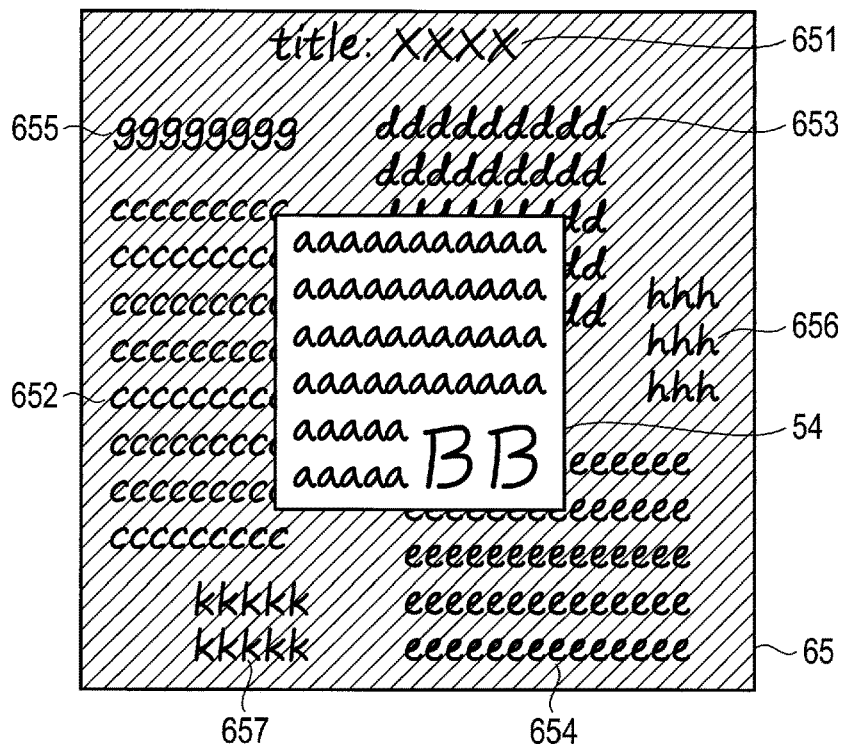
FIG. 20 is an example in which an editable object is displayed on the shared screen (canvas) by the electronic apparatus of the embodiment.

In the example shown in FIG. 20, according to the instructions of the paste process module 332, it is determined that no blank area suitable for pasting the object 54 exists on a canvas 65 on which many objects 651 to 657 are already rendered. According to the instruction of the display process module 31, the object 54 in the editable state is displayed at a particular position (for example, the center, the upper left end, etc.) on the canvas 65 in accordance with this determination. The user can perform an operation for changing the size or position of the object 54 being displayed. The object 54 whose size or position has been changed in accordance with this operation is displayed. Further, as the user performs an operation indicating that an edit of the object 54 is completed, the edited object 54 is pasted (rendered) onto the canvas 65.

Note that the user can also perform an operation for deleting the object 54 being displayed in the editable state (that is, an operation for canceling the instruction of pasting the object 54). According to the instruction of the display process module 31, the object 54 displayed on the canvas 65 is deleted in accordance with this operation.

Figure 21:
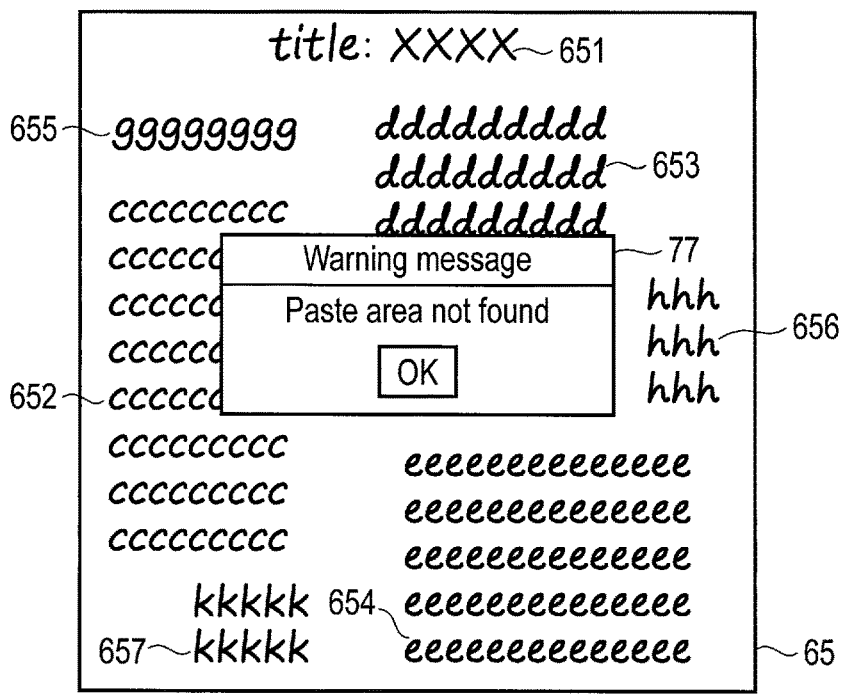
FIG. 21 is an illustration showing an example in which a message indicating that an object cannot be pasted onto the shared screen (canvas) is displayed by the electronic apparatus of the embodiment.

In addition, according to the instruction of the display process module 31, a message (a dialog box) 77 indicating that no blank area suitable for pasting the object 54 exists on the canvas 65 can be displayed, as shown in FIG. 21.

Further, according to the instructions of the paste process module 332, if no blank area which allows the pasting of the object 54 is found even if the object 54 is reduced to a particular reduction ratio (for example, thirty percent), an area which overlaps the least with the existing object areas may be determined as being a paste area of the object 54. The object (the reduced object) 54 is rendered in the determined paste area.

According to the instructions of the transmission control module 34 and the reception control module 35, data for sharing the objects pasted in the first view (canvas) is exchanged between the electronic apparatuses which use the handwriting sharing service. A process according to the role of the tablet computer 10, that is, whether the tablet computer 10 corresponds to the owner or the client of the handwriting sharing service.

First, a case where the tablet computer 10 corresponds to the owner of the handwriting sharing service will be described.

Object data corresponding to the pasted object 54 is transmitted to an external electronic apparatus, which is the client of the handwriting sharing service. The object data includes, for example, data such as handwritten strokes, characters, graphics, and images included in the object 54, and data indicating the position and size of an area into which the object 54 is pasted on the shared canvas. The external electronic apparatus receives the object data, and renders an object based on the received object data on the canvas (view) on the screen of the display provided in this apparatus.

Also, object data is received from an external electronic apparatus, which is the client of the handwriting sharing service. According to the instructions of the display process module 31, an object is rendered based on the received object data in the first view (canvas). Further, the received object data is transmitted to another external electronic apparatus, which is also the client of the handwriting sharing service.

Next, a case where the tablet computer 10 corresponds to the client of the handwriting sharing service will be described.

Object data corresponding to the pasted object 54 is transmitted to an external electronic apparatus, which is the owner of the handwriting sharing service. The external electronic apparatus receives the object data, and renders an object based on the received object data on the canvas (view) on the screen of the display provided in this apparatus. Further, the external electronic apparatus transmits the received object data to another (second) external electronic apparatus, which is also the client of the handwriting sharing service. This second client external electronic apparatus receives the object data, and renders an object based on the received object data on the canvas (view) on the screen of the display provided in the second client external electronic apparatus.

In addition, object data is received from the external electronic apparatus, which is the owner of the handwriting sharing service. This object data is data generated by the owner external electronic apparatus or the second client external electronic apparatus. According to the instructions of the display process module 31, an object is rendered based on the received object data in the first view (canvas).

By the above process, the canvas on which the same objects are rendered can be displayed in each of the electronic apparatuses which participate in the handwriting sharing service (group).

Next, referring to the flowchart of FIG. 22, an example of the procedure of a copy process executed by the tablet computer 10 will be described. On the screen of the touchscreen display 17, a view including a first object which is to be copied (or cut) by the user is displayed. This view may be, for example, a first view displayed by using the handwriting sharing application program 202, or a second view displayed by using another application program such as the notebook application program 203. The first view is a view including at least a part of the canvas (document) shared between the tablet computer 10 and at least one other electronic apparatus. Further, the second view is a view for creating (editing) a document including various objects such as handwritten strokes, characters, graphics, and images. In the following, a case where the second view is displayed on the screen is exemplified.

First, the CPU 101 of the tablet computer 10 determines whether an operation for selecting an area is performed on the screen of the touchscreen display 17 (block B11). The operation for selecting the area is an operation for inputting, for example, a stroke which specifies a starting point and an end point of a rectangular area or a stroke which freely specifies the shape of the area on the screen. If the operation for selecting the area is not performed (No in block B11), the processing returns to block B11 and it is determined again whether the operation for selecting the area is performed.

If the operation for selecting the area is performed (Yes in block B11), the CPU 101 determines whether an operation for instructing the copying is performed or not (block B12). If the operation for instructing the copying is not performed (No in block B12), the processing returns to block B12 and it is determined again whether the operation for instructing the copying is performed. Note that the CPU 101 may determine whether an operation for instructing the cutting is performed instead of the operation for instructing the copying in block B12.

If the operation for instructing the copying is performed (Yes in block B12), the CPU 101 saves data on the first object within the selected area in the clipboard area 401A (block B13). The clipboard area 401A is a storage area in which data on a copied (or cut) object is temporarily stored, and is provided in, for example, the main memory 103. The first object may also include a handwritten stroke, a character, graphics, or an image, or a combination thereof.

The above-described procedure of the copy process corresponds to a process by the CPU 101 executing the notebook application program 203. Note that when the first view is displayed on the screen and the object in the first view is to be copied (or cut), the procedure of the copy process corresponds to a process by the CPU 110 executing the handwriting sharing application program 202.

The flowchart of FIG. 23 shows an example of the procedure of a paste process for pasting the first object obtained by the above-described copy process onto the canvas shared between the tablet computer 10 and at least one other electronic apparatus. In the following, a case where at least a part of the canvas is displayed on the screen of the touchscreen display 17 is exemplified.

First, the CPU 101 determines whether an operation for selecting an area is performed on the canvas (first view) which is displayed (block B201). The operation for selecting the area is an operation for inputting, for example, a stroke which specifies a starting point and an end point of a rectangular area or a stroke which freely specifies the shape of the area on the screen. By this operation, the user can roughly specify the area into which the first object can be pasted.

If the operation for selecting the area is performed (Yes in block B201), the CPU 101 determines whether an operation for instructing the pasting is performed or not (block B202).

If the operation for instructing the pasting is not performed (No in block B202), the processing returns to block B202 and it is determined again whether the operation for instructing the pasting is performed.

If the operation for instructing the pasting is performed (Yes in block B202), the CPU 101 sets the selected area to a search area in which an area allowing the first object to be pasted is searched (block B203).

Also, if an operation for selecting the area is not performed (No in block B201), the CPU 101 determines whether the operation for instructing the pasting is performed or not (block B204). If the operation for instructing the pasting is not performed (No in block B204), the processing returns to block B201 and it is determined again whether the operation for selecting the area is performed.

If the operation for instructing the pasting is performed (Yes in block B204), that is, when the operation for instructing the pasting is performed without selecting an area on the canvas, the CPU 101 determines whether the entire canvas is displayed on the screen (block B205). If the entire canvas is displayed on the screen (Yes in block B205), the CPU 101 sets the entire canvas to a search area in which an area into allowing the first object to be pasted is searched (block B207).

Meanwhile, if the entire canvas is not displayed on the screen, that is, when only a part of the canvas is displayed on the screen (No in block B205), the CPU 101 sets a part displayed on the screen of the canvas to a search area in which an area allowing the first object to be pasted is searched (block B206).

Next, the CPU 101 adds a margin to the first object based on the data stored in the clipboard area 401A (block B208). The CPU 101 saves the data on the first object to which the margin is added in, for example, the work memory 401.

Further, the CPU 101 executes an area determination process for determining a blank area allowing the first object (that is, the first object to which the margin is added) to be pasted from the set search area (block B209). In this area determination process, when an object is already rendered (arranged) within the set search area, an area allowing the first object to be pasted is determined from a blank area not having the object rendered thereon. Note that in the area determination process, when a blank area allowing the first object to be pasted does not exist in the search area, a processing result indicating that an area suitable for pasting is not available is output. The detailed procedure of the area determination process will be described later referring to the flowchart of FIG. 24.

The CPU 101 determines whether an area allowing the first object to be pasted is determined or not by the executed area determination process (block B210). If an area allowing the first object to be pasted is determined (Yes in block B210), the CPU 101 pastes the first object into the determined area (block B211), that is, renders the first object in the determined area.

If an area allowing the first object to be pasted is not determined (No in block B210), the CPU 101 displays the first object in an editable state at a particular position (for example, the center, the upper left end, etc.) on the displayed canvas (the first view) (block B212). The user can perform an operation for changing the displayed size or position for the first object being displayed. Also, the user can perform an operation for deleting the first object being displayed. Note that the CPU 101 may display a message (a dialog box) indicating that an area suitable for pasting is not available in the search area on the canvas (block B213).

Figure 24:
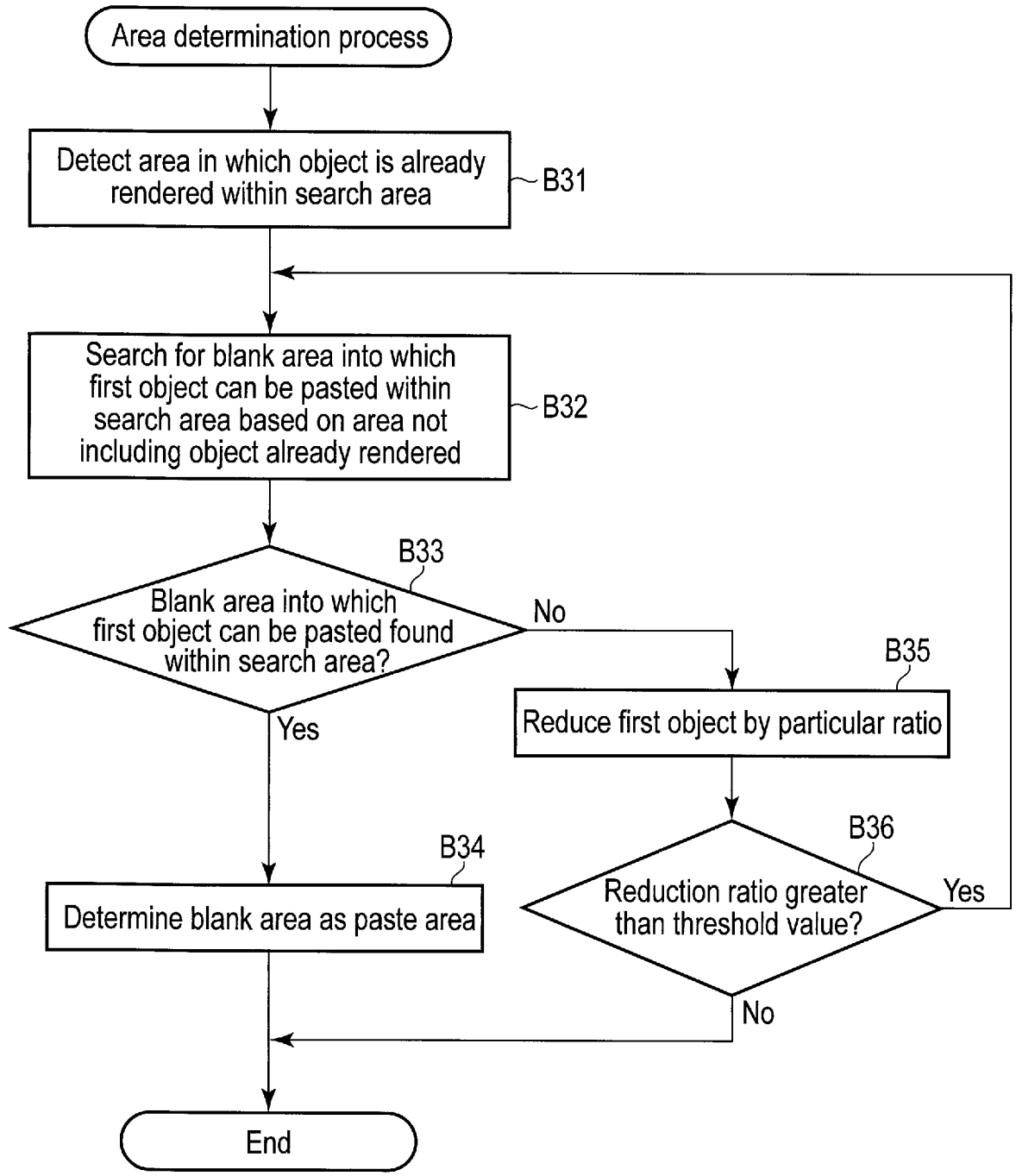
FIG. 24 is a flowchart showing an example of the procedure of an area determination process executed by the electronic apparatus of the embodiment.

Next, the flowchart of FIG. 24 shows an example of the procedure of the area determination process.

First, the CPU 101 detects an existing object area in which an object is already rendered (arranged) within the search area (block B31). The CPU 101 searches for a blank area allowing the first object to be pasted within the search area based on an area which is not the detected existing object area (block B32). The CPU 101 raster scans the search area, for example, thereby determining whether an interest region within the search area is a blank area allowing the first object to be pasted, and this determination is repeated by shifting the interest region by a first quantity (for example, one pixel) at a time.

Next, the CPU 101 determines whether a blank area allowing the first object to be pasted is found within the search area (block B33). If a blank area allowing the first object to be pasted is found within the search area (Yes in block B33), the CPU 101 determines that the blank area as being a paste area of the first object (block B34).

If no blank area allowing the first object to be pasted is found within the search area (No in block B33), the CPU 101 reduces the first object by a particular ratio (for example, ten percent) (block B35). Further, the CPU 101 determines whether the ratio of the size of the reduced first object to the size of the original first object, that is the reduction ratio, is greater than a threshold value (for example, thirty percent) or not (block B36). If the reduction ratio is greater than the threshold value (Yes in block B36), the CPU 101 returns to the processing of block B32, and performs the process for determining a blank area allowing the reduced first object to be pasted. That is, while the reduction ratio is greater than the threshold value, a blank area allowing the reduced first object to be pasted is searched.

If the reduction ratio is less than or equal to the threshold value (No in block B36), the CPU 101 finishes the process without determining a paste area of the first object. That is, if the first object is reduced to such an extent that it will be hard to see, the CPU 101 finishes the process without determining a paste area of the first object.

Further, referring to the flowchart of FIG. 25, an example of the procedure of a sharing process when the tablet computer 10 is an owner apparatus will be described.

First, the CPU 101 determines whether an object is pasted onto the shared canvas or not (block B41). If the object is not pasted onto the shared canvas (No in block B41), the procedure of block B42 is skipped.

If the object is pasted onto the shared canvas (Yes in block B41), the CPU 101 transmits the object data indicative of the object and the area into which the object is pasted to a client apparatus via, for example, the transmitter 107T of the wireless communication device 107 (block B42). The object data includes, for example, data such as handwritten strokes, characters, graphics, and images included in the object, and data indicative of the position and size of an area into which the object is pasted onto the shared canvas. As will be described later referring to the flowchart of FIG. 26, the client apparatus receives the object data, and renders an object based on the received object data on the shared canvas on the screen of the display provided in the client apparatus.

Next, the CPU 101 determines whether object data from the client apparatus is received via, for example, the receiver 107R of the wireless communication device 107 (block B43). The object data indicates an object pasted onto the shared canvas of the client apparatus and the area into which the object is pasted. If the object data is not received from the client apparatus (No in block B43), the procedure of blocks B44 and B45 is skipped.

If the object data is received from the client apparatus (Yes in block B43), the CPU 101 renders an object based on the received object data on the shared canvas (block B44). Further, the CPU 101 transmits the received object data to a client apparatus other than the client apparatus from which the object data was received via the transmitter 107T (block B45).

Figure 26:
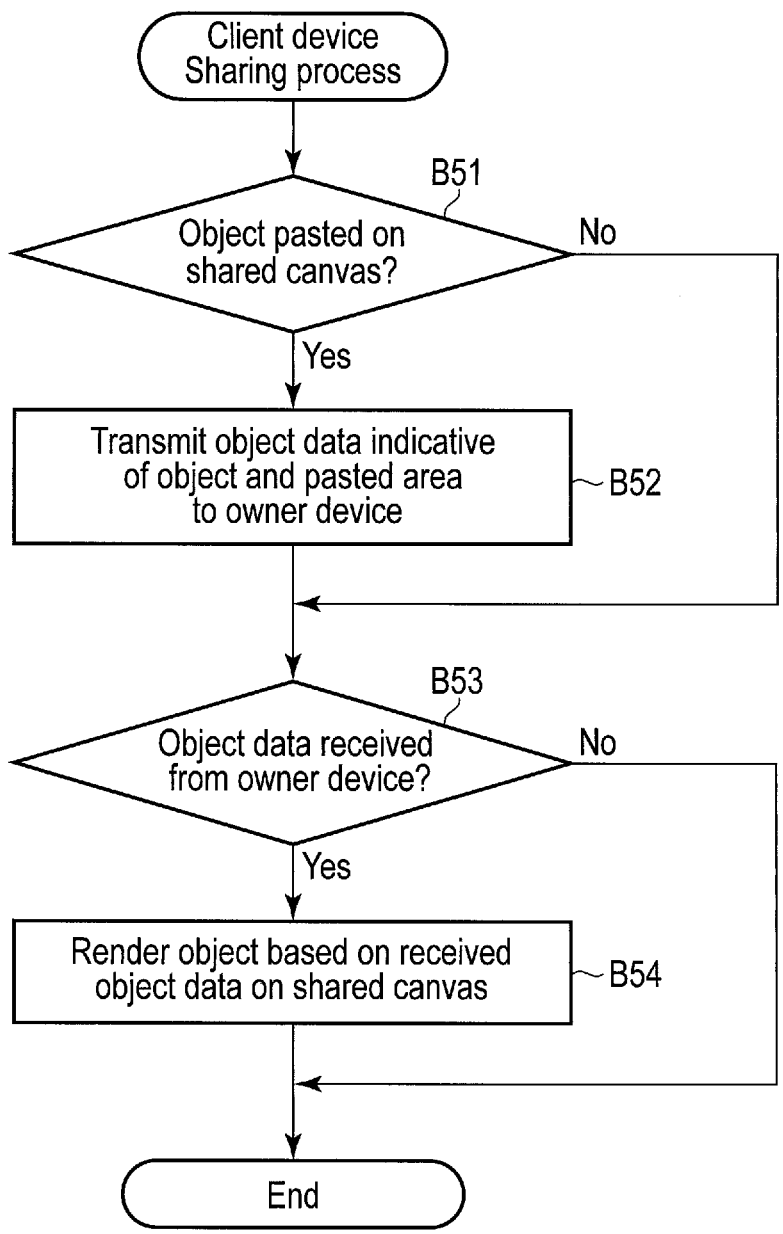
FIG. 26 is a flowchart showing an example of the procedure of a sharing process executed by the electronic apparatus of the embodiment when this electronic apparatus is a client apparatus of the handwriting sharing service.

Referring to the flowchart of FIG. 26, an example of the procedure of a sharing process when the tablet computer 10 is a client apparatus will be described.

First, the CPU 101 determines whether an object is pasted onto the shared canvas or not (block B51). If the object is not pasted onto the shared canvas (No in block B51), the procedure of block B52 is skipped.

If the object is pasted onto the shared canvas (Yes in block B51), the CPU 101 transmits the object data indicative of the object and the area into which the object is pasted to the owner apparatus via, for example, the transmitter 107T of the wireless communication device 107 (block B52). As has been described above referring to the flowchart of FIG. 25, the owner apparatus receives the object data, renders an object based on the received object data on the shared canvas on the screen of the display provided in the owner apparatus, and transmits this object data to another client apparatus.

Next, the CPU 101 determines whether object data from the owner apparatus is received via, for example, the receiver 107R of the wireless communication device 107 (block B53). The object data indicates an object pasted onto the shared canvas of the owner apparatus or another client apparatus and the area into which the object is pasted. If the object data is not received from the owner apparatus (No in block B53), the procedure of block B54 is skipped.

If the object data is received from the owner apparatus (Yes in block B53), the CPU 101 renders an object based on the received object data on the shared canvas (block B54).

By such a sharing process by the owner apparatus and a sharing process by the client apparatus, a canvas having the same content can be displayed in the owner apparatus and the client apparatus, in other words, the canvas can be shared between the owner apparatus and the client apparatus.

As described above, according to the present embodiment, it is possible to paste a new object onto the canvas without reducing the visibility of objects already rendered on the shared canvas. A first view is displayed on the screen of the LCD 17A. The first view includes a part of a document shared between the tablet computer 10 and at least one other electronic apparatus. In the first view, first handwritten strokes input on the tablet computer 10 and the at least one other electronic apparatus are rendered. When an operation for pasting a first object which is rendered on the screen of the LCD 17A (for example, a part of a screen image generated by the CPU 101 executing the notebook application program 203) in the first view is performed after performing an operation for copying or cutting the first object, it is determined whether a first blank area allowing the first object to be pasted exists in the first view, based on an area free of the first handwritten strokes in the first view displayed on the screen of the LCD 17A. If it is determined that the first blank area exists, the first object is rendered in the first blank area.

In this way, since the first object is rendered in the blank area which does not overlap the first handwritten strokes rendered in the first view, the first object can be pasted in the first view without reducing the visibility of the first handwritten strokes. In addition, since the user does not need to perform the operation of adjusting the position or size of the first object, the user's work labor can be reduced.

Further, each of various functions described in the present embodiment may be implemented by a circuit (processing circuit). Examples of the processing circuit include a programmed processor such as a central processing unit (CPU). The processor executes each of the described functions by executing a computer program (an instruction group) stored in the memory. The processor may be a microprocessor including an electronic circuit. The examples of the processing circuit also include a digital signal processor (DSP), an application specific integrated circuit (ASIC), a microcontroller, a controller, and the other electronic circuit components. Each of the components other than the CPU described in the present embodiment may also be implemented by a processing circuit.

In addition, since various types of processing of the present embodiment can be implemented by a computer program, the same advantages as those of the present embodiment can easily be obtained by installing the computer program in a computer via a computer-readable storage medium storing the computer program and by executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a display; and
    a hardware processor configured to execute a sharing application program having a function for sharing a canvas between a plurality of electronic apparatuses including the electronic apparatus,
    wherein the hardware processor is configured to:
        display a first view on a screen of the display, wherein the first view includes a part of the canvas shared between the plurality of electronic apparatuses and first handwritten strokes being input from the plurality of electronic apparatuses are rendered in the first view;
        determine, when an operation for pasting a first object, which is rendered on the screen, onto the first view is performed after performing an operation for copying or cutting the first object, whether a first blank area allowing the first object to be pasted exists in the first view, based on an area free of the first handwritten strokes in the first view displayed on the screen;
        render the first object in the first blank area if the hardware processor determines that the first blank area exists; and
        display the first object in a user-editable state on the first view if the hardware processor determines that the first blank area does not exist.

2. The electronic apparatus of claim 1, wherein:
    the first view includes a part of a screen image generated by the sharing application program as an area displayed on the screen;
    a second view includes a part of a screen image generated by a second application program different from the sharing application program as an area displayed on the screen; and
    if the first object is rendered on the second view, the operation for copying or cutting the first object is performed on the second view.

3. The electronic apparatus of claim 1, wherein the hardware processor is configured not to render the first object in the first view if the hardware processor determines that the first blank area allowing the first object to be pasted does not exist in the first view.

4. The electronic apparatus of claim 1, wherein the hardware processor is configured:
    to reduce the first object by a first ratio if the hardware processor determines that the first blank area allowing the first object to be pasted does not exist in the first view;
    to determine whether a second blank area allowing the reduced first object to be pasted exists in the first view;
    to render the reduced first object in the second blank area if the hardware processor determines that the second blank area exists;
    to reduce the first object by a second ratio greater than the first ratio and determine whether a third blank area allowing the reduced first object to be pasted exists in the first view, if the hardware processor determined that the second blank area does not exist.

5. The electronic apparatus of claim 1, wherein the hardware processor is configured to:
    add, when the operation for pasting the first object on the first view is performed after performing an operation for copying or cutting the first object rendered on the screen, a margin to the first object and determine whether the first blank area allowing the first object with the margin to be pasted exists in the first view based on the area free of the first handwritten strokes in the first view displayed on the screen; and
    render the first object with the margin in the first blank area if the hardware processor determines that the first blank area exists.

6. The electronic apparatus of claim 1, wherein the hardware processor is configured to render, if areas allowing the first object to be pasted exist in the first view, the first object in an area having a largest size, an area closest to a center of the first view, or an area having a greatest distance from areas corresponding to the first handwritten strokes among the areas.

7. A method of controlling an electronic apparatus that comprises a display and a processor configured to execute a sharing program having a function for sharing a canvas between a plurality of electronic apparatuses including the electronic apparatus, the method comprising:
    displaying a first view on a screen of a display, wherein the first view includes a part of the canvas shared between the plurality of electronic apparatuses and first handwritten strokes being input from the plurality of electronic apparatuses are rendered in the first view;
    determining, when an operation for pasting a first object, which is rendered on the screen, onto the first view is performed after performing an operation for copying or cutting the first object, whether a first blank area allowing the first object to be pasted exists in the first view, based on an area free of the first handwritten strokes in the first view displayed on the screen;

rendering the first object in the first blank area if it is determined that the first blank area exists; and displaying the first object in a user-editable state on the first view if the hardware processor determines that the first blank area does not exist.

8. The method of claim 7, wherein:

the first view includes a part of a screen image generated by a first the sharing application program as an area displayed on the screen;

a second view includes a part of a screen image generated by a second application program different from the first sharing application program as an area displayed on the screen; and if the first object is rendered on the second view, the operation for copying or cutting the first object is performed on the second view.

9. The method of claim 7, further comprising refraining from rendering the first object on the first view if it is determined that the first blank area allowing the first object to be pasted does not exist in the first view.

10. The method of claim 7, further comprising:

reducing the first object by a first ratio if it is determined that the first blank area allowing the first object to be pasted does not exist in the first view;

determining whether a second blank area allowing the reduced first object to be pasted exists in the first view;

rendering the reduced first object in the second blank area if it is determined that the second blank area exists; and reducing the first object by a second ratio greater than the first ratio and determine whether a third blank area allowing the reduced first object to be pasted exists in the first view, if it is determined that the second blank area does not exist.

11. The method of claim 7, further comprising:

adding, when the operation of pasting the first object on the first view is performed after performing an operation of copying or cutting the first object rendered on the screen, a margin to the first object and determining whether the first blank area allowing the first object with the margin to be pasted exists in the first view based on the area free of the first handwritten strokes in the first view displayed on the screen; and rendering, if it is determined that the first blank area exists, the first object with the margin in the first blank area.

12. The method of claim 7, further comprising rendering, if areas allowing the first object to be pasted exist in the first view, the first object in an area having a largest size, an area closest to a center of the first view, or an area having a greatest distance from areas corresponding to the first handwritten strokes among the areas.

* * * * *